United States Patent
Fujii et al.

(10) Patent No.: US 8,861,956 B2
(45) Date of Patent: Oct. 14, 2014

(54) APPARATUS AND METHOD FOR SWITCHING PATHS IN A WAVELENGTH-MULTIPLEXING NETWORK

(75) Inventors: Yasuki Fujii, Kawasaki (JP); Ryoichi Mutoh, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 13/533,332

(22) Filed: Jun. 26, 2012

(65) Prior Publication Data

US 2013/0028592 A1   Jan. 31, 2013

(30) Foreign Application Priority Data

Jul. 27, 2011   (JP) .................. 2011-164197

(51) Int. Cl.
*H04J 14/00*   (2006.01)
*H04J 14/02*   (2006.01)
*H04Q 11/00*   (2006.01)

(52) U.S. Cl.
CPC ......... *H04J 14/0295* (2013.01); *H04J 14/0269* (2013.01); *H04Q 2011/0039* (2013.01); *H04J 14/0283* (2013.01); *H04Q 11/0005* (2013.01)
USPC ........................ 398/48; 398/5; 398/7; 398/46

(58) Field of Classification Search
CPC .... H04B 10/03; H04B 10/038; H04B 10/032; H04B 10/035; H04Q 11/0001; H04J 14/0287; H04J 14/0289; H04J 14/0291; H04J 14/0293; H04J 14/0294; H04J 14/0297

USPC ......................... 398/1–3, 5, 7, 45, 46, 49, 50
See application file for complete search history.

(56) References Cited

U.S. PATENT DOCUMENTS

| | | | |
|---|---|---|---|
| 5,299,293 A * | 3/1994 | Mestdagh et al. | 398/24 |
| 6,607,311 B1 * | 8/2003 | Fishman et al. | 398/79 |
| 6,678,473 B1 * | 1/2004 | Morthier | 398/56 |
| 7,274,869 B1 * | 9/2007 | Pan | 398/5 |

FOREIGN PATENT DOCUMENTS

| | | |
|---|---|---|
| JP | 1 021 011 | 7/2000 |
| JP | 2000-209152 | 7/2000 |
| JP | 2000-209244 | 7/2000 |

* cited by examiner

*Primary Examiner* — Dalzid Singh
(74) *Attorney, Agent, or Firm* — Staas & Halsey LLP

(57) ABSTRACT

An apparatus switches paths in a wavelength-multiplexing network in which a first number of wavelengths each used for a path to transmit an optical signal are multiplexed into an optical fiber. The apparatus includes an entire switching unit and a second number of individual switching units where the second number is smaller than the first number. The entire switching unit is configured to perform a path-switching process for switching a path, simultaneously on all the first number of wavelengths when failures have occurred for all the first number of wavelengths. The second number of individual switching units are each configured to perform the path-switching process individually on one of a third number of wavelengths included in the first number of wavelengths when at least one failure has occurred for the third number of wavelengths where the third numbers is smaller than the first number.

10 Claims, 21 Drawing Sheets

FIG. 3

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| BRIDGE REQUEST CODE | | | | L/S | STATUS | | | DESTINATION NODE ID | | | | | | | | SOURCE NODE ID | | | | | | | | B | RESERVED | | | | | | |

FIG. 5

| NODE A → NODE B | d1a(λ1) TO d1a(λn) | λ1: NR, A-B, 1<br>λ2: NR, A-B, 1<br>⋮<br>λn: NR, A-B, 1 |
|---|---|---|
| NODE A → NODE D | d1b(λ1) TO d1b(λn) | λ1: NR, A-D, 1<br>λ2: NR, A-D, 1<br>⋮<br>λn: NR, A-D, 1 |
| NODE B → NODE C | d2a(λ1) TO d2a(λn) | λ1: NR, B-C, 1<br>λ2: NR, B-C, 1<br>⋮<br>λn: NR, B-C, 1 |
| NODE B → NODE A | d2b(λ1) TO d2b(λn) | λ1: NR, B-A, 1<br>λ2: NR, B-A, 1<br>⋮<br>λn: NR, B-A, 1 |
| NODE C → NODE D | d3a(λ1) TO d3a(λn) | λ1: NR, C-D, 1<br>λ2: NR, C-D, 1<br>⋮<br>λn: NR, C-D, 1 |
| NODE C → NODE B | d3b(λ1) TO d3b(λn) | λ1: NR, C-B, 1<br>λ2: NR, C-B, 1<br>⋮<br>λn: NR, C-B, 1 |
| NODE D → NODE A | d4a(λ1) TO d4a(λn) | λ1: NR, D-A, 1<br>λ2: NR, D-A, 1<br>⋮<br>λn: NR, D-A, 1 |
| NODE D → NODE C | d4b(λ1) TO d4b(λn) | λ1: NR, D-C, 1<br>λ2: NR, D-C, 1<br>⋮<br>λn: NR, D-C, 1 |

FIG. 7

| | | |
|---|---|---|
| NODE A → NODE B | d11a(λ1) TO d11a(λn) | λ1: RR-R, A-B, 1<br>λ2: RR-R, A-B, 1<br>⋮<br>λn: RR-R, A-B, 1 |
| NODE A → NODE D | d11b(λ1) TO d11b(λn) | λ1: SF-R, A-B, 1<br>λ2: SF-R, A-B, 1<br>⋮<br>λn: SF-R, A-B, 1 |
| NODE B → NODE C | d12a(λ1) TO d12a(λn) | λ1: SF-R, B-A, 1<br>λ2: SF-R, B-A, 1<br>⋮<br>λn: SF-R, B-A, 1 |
| NODE B → NODE A | d12b(λ1) TO d12b(λn) | λ1: SF-R, B-A, 1<br>λ2: SF-R, B-A, 1<br>⋮<br>λn: SF-R, B-A, 1 |
| NODE C → NODE D | d12a(λ1) TO d12a(λn) | λ1: SF-R, B-A, 1<br>λ2: RR-R, B-A, 1<br>⋮<br>λn: SF-R, B-A, 1 |
| NODE C → NODE B | d11b(λ1) TO d11b(λn) | λ1: SF-R, A-B, 1<br>λ2: SF-R, A-B, 1<br>⋮<br>λn: SF-R, A-B, 1 |
| NODE D → NODE A | d12a(λ1) TO d12a(λn) | λ1: SF-R, B-A, 1<br>λ2: SF-R, B-A, 1<br>⋮<br>λn: SF-R, B-A, 1 |
| NODE D → NODE C | d11b(λ1) TO d11b(λn) | λ1: SF-R, A-B, 1<br>λ2: SF-R, A-B, 1<br>⋮<br>λn: SF-R, A-B, 1 |

FIG. 12

| NODE A → NODE B | d21a(λ1) TO d21a(λn) | λ1: NR, A-B, 1<br>λ2: RR-R, A-B, 0<br>⋮<br>λn: NR, A-B, 1 |
|---|---|---|
| NODE A → NODE D | d21b(λ1) TO d21b(λn) | λ1: NR, A-D, 1<br>λ2: SF-R, A-B, 0<br>⋮<br>λn: NR, A-D, 1 |
| NODE B → NODE C | d22a(λ1) TO d22a(λn) | λ1: NR, B-C, 1<br>λ2: SF-R, B-A, 0<br>⋮<br>λn: NR, B-C, 1 |
| NODE B → NODE A | d22b(λ1) TO d22b(λn) | λ1: NR, B-A, 1<br>λ2: SF-R, B-A, 0<br>⋮<br>λn: NR, B-A, 1 |
| NODE C → NODE D | d23a(λ1) TO d23a(λn) | λ1: NR, C-D, 1<br>λ2: SF-R, B-A, 0<br>⋮<br>λn: NR, C-D, 1 |
| NODE C → NODE B | d23b(λ1) TO d23b(λn) | λ1: NR, C-B, 1<br>λ2: SF-R, A-B, 0<br>⋮<br>λn: NR, C-B, 1 |
| NODE D → NODE A | d24a(λ1) TO d24a(λn) | λ1: NR, D-A, 1<br>λ2: SF-R, B-A, 0<br>⋮<br>λn: NR, D-A, 1 |
| NODE D → NODE C | d24b(λ1) TO d24b(λn) | λ1: NR, D-C, 1<br>λ2: SF-R, A-B, 0<br>⋮<br>λn: NR, D-C, 1 |

FIG. 17

| | | |
|---|---|---|
| NODE A → NODE B | d31a(λ1) TO d31a(λn) | λ1: RR-R, A-B, 1<br>λ2: RR-R, A-B, 0<br>⋮<br>λn: RR-R, A-B, 1 |
| NODE A → NODE D | d31b(λ1) TO d31b(λn) | λ1: SF-R, A-B, 1<br>λ2: SF-R, A-B, 0<br>⋮<br>λn: SF-R, A-B, 1 |
| NODE B → NODE C | d32a(λ1) TO d32a(λn) | λ1: SF-R, B-A, 1<br>λ2: SF-R, B-A, 0<br>⋮<br>λn: SF-R, B-A, 1 |
| NODE B → NODE A | d32b(λ1) TO d32b(λn) | λ1: SF-R, B-A, 1<br>λ2: SF-R, B-A, 0<br>⋮<br>λn: SF-R, B-A, 1 |
| NODE C → NODE D | d33a(λ1) TO d33a(λn) | λ1: SF-R, B-A, 1<br>λ2: RR-R, C-D, 0<br>⋮<br>λn: SF-R, B-A, 1 |
| NODE C → NODE B | d33b(λ1) TO d33b(λn) | λ1: SF-R, A-B, 1<br>λ2: SF-R, C-D, 0<br>⋮<br>λn: SF-R, A-B, 1 |
| NODE D → NODE A | d34a(λ1) TO d34a(λn) | λ1: SF-R, B-A, 1<br>λ2: SF-R, D-C, 0<br>⋮<br>λn: SF-R, B-A, 1 |
| NODE D → NODE C | d34b(λ1) TO d34b(λn) | λ1: SF-R, A-B, 1<br>λ2: SF-R, D-C, 0<br>⋮<br>λn: SF-R, A-B, 1 |

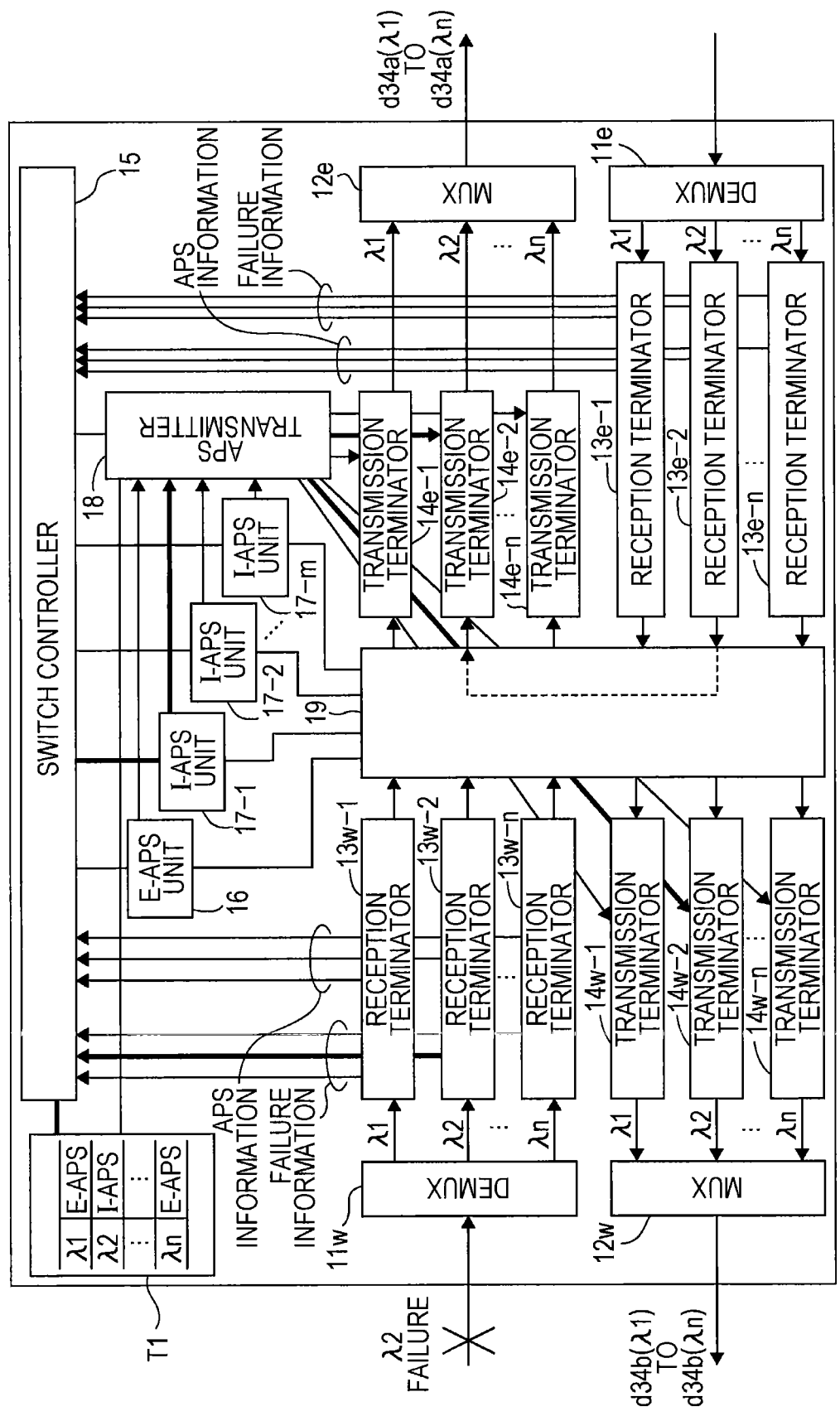

APPARATUS AND METHOD FOR SWITCHING PATHS IN A WAVELENGTH-MULTIPLEXING NETWORK

CROSS-REFERENCE TO RELATED APPLICATION

This application is based upon and claims the benefit of priority of the prior Japanese Patent Application No. 2011-164197, filed on Jul. 27, 2011, the entire contents of which are incorporated herein by reference.

FIELD

The embodiment discussed herein is related to an apparatus and method for switching paths in a wavelength-multiplexing network.

BACKGROUND

As a high-speed and large-capacity network has been developed in recent years, an optical network that performs WDM (Wavelength Division Multiplexing) using an OTN (Optical Transport Network: ITU-T G. 709) has been put into practical use.

The OTN is a technique for accommodating client signals conforming to SONET/SDH (Synchronous Optical Network/Synchronous Digital Hierarchy), Ethernet, or the like and for performing data transmission suitable for the WDM by generating a frame having a hierarchal structure.

Further, when a failure occurs, a protection method for recovering communication at high speed is required. In a ring network, protection methods such as BLSR (Bidirectional Line Switched Ring: Telcordia GR-1230-CORE) and MS SPRING (Multiplex Section Shared Protection Ring: ITU-T G.841) have been used in general. In these protection methods, traffic is looped back at each of end nodes of a failed link along the ring so that the failure is bypassed.

A technique of recovering a failure of a WDN ring network is disclosed, for example, by Japanese Laid-open Patent Publication Nos. 2000-209244 and 2000-209152.

SUMMARY

According to an aspect of the invention, there is provided an apparatus for switching paths in a wavelength-multiplexing network in which a first number of wavelengths each used for a path to transmit an optical signal are multiplexed into an optical fiber. The apparatus includes an entire switching unit and a second number of individual switching units where the second number is smaller than the first number. The entire switching unit is configured to perform a path-switching process for switching a path, simultaneously on all the first number of wavelengths when failures have occurred for all the first number of wavelengths. The second number of individual switching units are each configured to perform the path-switching process individually on one of a third number of wavelengths included in the first number of wavelengths when at least one failure has occurred for the third number of wavelengths where the third numbers is smaller than the first number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a configuration example of APS (Automatic Protection Switching) information, according to an embodiment;

FIG. 5 is a diagram illustrating an example of APS information, according to an embodiment;

FIG. 7 is a diagram illustrating an example of APS information, according to an embodiment;

FIG. 12 is a diagram illustrating an example of APS information, according to an embodiment;

FIG. 17 is a diagram illustrating an example of APS information, according to an embodiment;

FIG. 18 is a diagram illustrating an example of an internal operation state of a node, according to an embodiment;

DESCRIPTION OF EMBODIMENT

When the protection method described above such as a BLSR or a MS SPRING is simply applied to a WDM ring network, a plurality of protection rings that are configured for respective wavelengths are operated independently with each other.

In a WDM ring network to which a protection method according to the related art is applied, as many processing circuits as the number of wavelengths used for the WDM need to be always provided so as to control a protection ring for each of the wavelengths. For example, a WDM network in which optical signals having hundred wavelengths are multiplexed and transmitted is configured to include hundred processing circuits for switching paths transmitting optical signals having hundred wavelengths. This causes a problem that a size of the required circuits increases, thereby increasing the power consumption and cost of the circuits.

Hereinafter, embodiments will be described with reference to the accompanying drawings.

Figure 1:
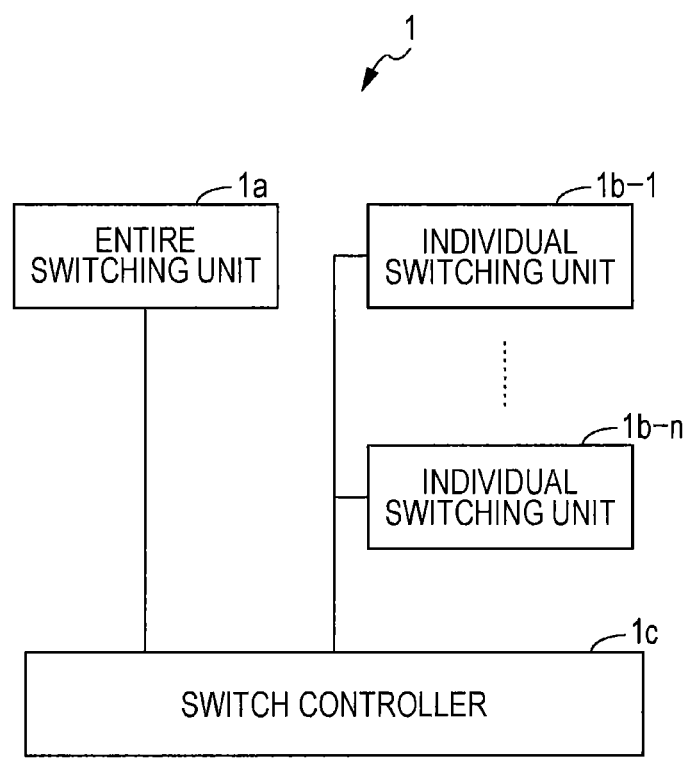
FIG. 1 is a diagram illustrating a configuration example of a transmission apparatus, according to an embodiment.

FIG. 1 is a diagram illustrating a configuration example of a transmission apparatus, according to an embodiment. A transmission apparatus 1 includes an entire switching unit 1a, individual switching units 1b-1 to 1b-n, and a switch controller 1c.

In response to failures that have occurred over optical signals having all the wavelengths to be used in a wavelength-division multiplexing network, the entire switching unit 1a performs a path-switching process for switching a path, simultaneously on all the relevant paths transmitting optical signals having the wavelengths being used for the network. Meanwhile, in response to at least one failure that has occurred for a subset of wavelengths included in all the wavelengths being used for the network where the number of wavelengths included in the subset of wavelengths is smaller than the number of all the wavelengths being used for the network, the individual switching units 1b-1 to 1b-n each perform the path-switching process individually on one of paths using the subset of wavelengths. Here, the number of the individual switching units 1b-1 to 1b-n is set at a value smaller than the number of all the wavelengths being used for the network.

The switch controller is assigns a path-switching process for switching a path transmitting an optical signal having a wavelength, to a switching unit that is selected from the entire switching unit 1a and the individual switching units 1b-1 to 1b-n based on failure information or protection information. For example, flag information indicating whether the path-switching process is to be performed simultaneously on all the wavelengths may be used as the protection information.

As described above, in the transmission apparatus 1, the path-switching process is performed by the entire switching unit 1a when failures have occurred for all the wavelengths being used for the network, for example, due to breakdown of an optical fiber. Meanwhile, the path-switching process is performed by the individual switching units 1b-1 to 1b-n when at least one failure has occurred for a subset of wavelengths included in all the wavelengths being used for the network, for example, due to a failure of a laser, where the number of wavelengths included in the subset of wavelengths is smaller than the number of all the wavelengths Since it is not highly likely that failures occur at the same time in a plurality of lasers, it is possible to prepare individual switching units 1b-1 to 1b-n so that the number of individual switching units 1b-1 to 1b-n is smaller than the number of wavelengths to be multiplexed, without preparing as many individual switching units 1b-1 to 1b-n as the number of wavelengths to be multiplexed. For example, when all the wavelengths are interrupted due to breakdown of the optical fiber, the entire switching unit 1a may perform path switching of all the wavelengths. Therefore, in the case, the number of individual switching units 1b-1 to 1b-n may be set at a number smaller than the total number of wavelengths.

With this configuration, the number of circuits needed for protection control may be reduced as a whole. For example, in a WDM network in which optical signals having a hundred wavelengths are multiplexed, when a transmission apparatus is configured to include one entire switching unit 1a and four individual switching units 1b-1 to 1b-4, a circuit size is reduced to 1/20 in comparison with that of the related art. Accordingly, the circuit size of the transmission apparatus may be reduced, and the power consumption and cost of the transmission apparatus may be also reduced.

Further, the switch controller is may be configured to assign the path-switching process to a switching unit that is selected from the entire switching unit 1a and the individual switching units 1b-1 to 1b-n based on the failure information or the value of flag information set in the protection information that is transferred between transmission apparatuses.

This allows path-switching process suitable for a failure state or an operation state of another transmission apparatus to be appropriately assigned to a switching unit that is selected from among the entire switching unit 1a and the individual switching units 1b-1 to 1b-n. Hereinafter, the protection information will be also referred to as "APS (Automatic Protection Switching) information". Hereinafter, a path-switching process that is performed on a path transmitting an optical signal having a wavelength will be also expresses as "a path-switching process on a wavelength" for ease of explanation.

Figure 2:
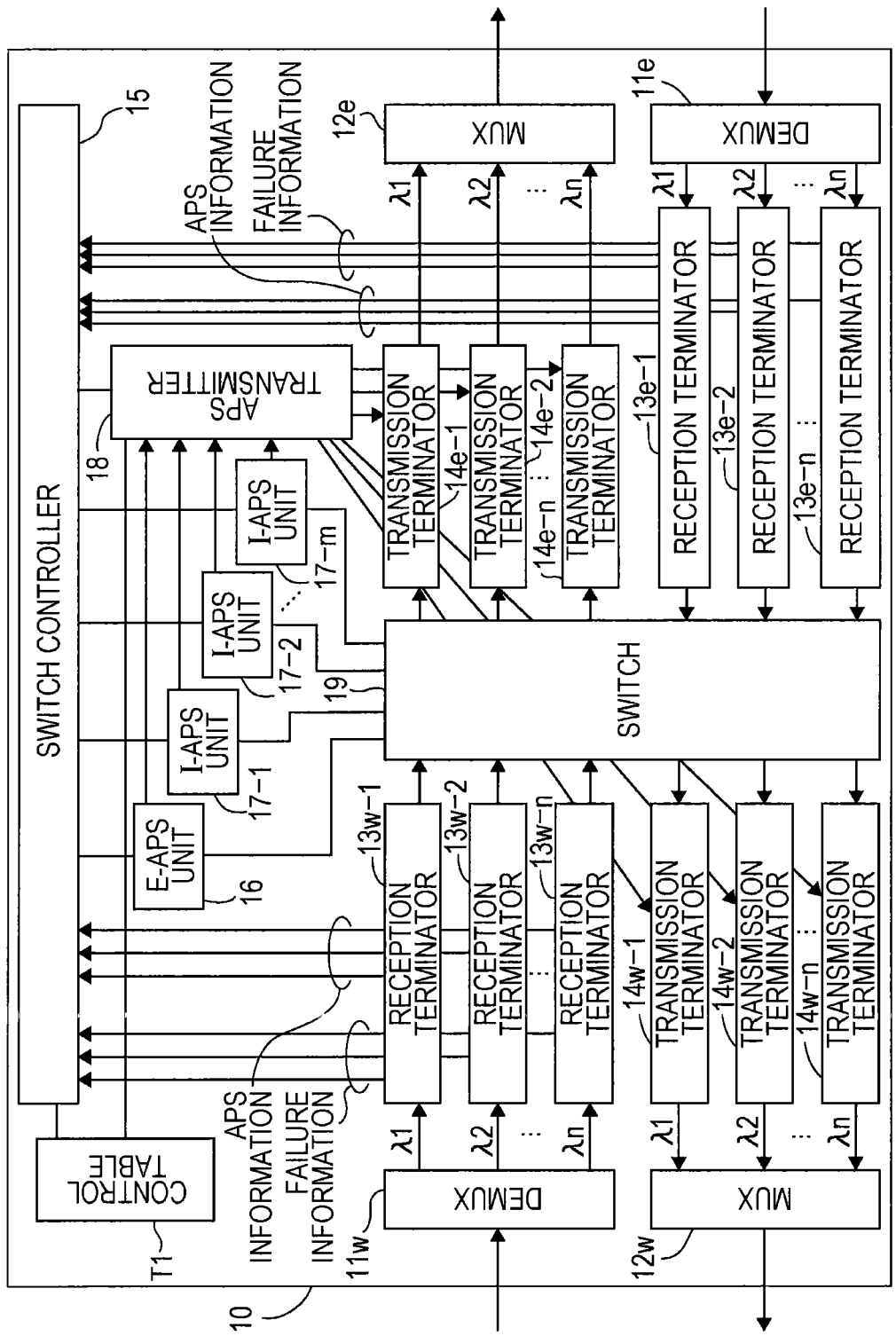
FIG. 2 is a diagram illustrating a configuration example of a transmission apparatus, according to an embodiment.

FIG. 2 is a diagram illustrating a configuration example of a transmission apparatus, according to an embodiment. The transmission apparatus 10 may be configured to include, for example, demultiplexers (DEMUXs) 11w and 11e, multiplexers (MUXs) 12w and 12e, reception terminators 13w-1 to 13w-n, reception terminators 13e-1 to 13e-n, transmission terminators 14w-1 to 14w-n, transmission terminators 14e-1 to 14e-n, a switch controller 15, an entire APS unit (denoted by "E-APS UNIT" in FIG. 2) 16, individual APS units (denoted by "I-APS UNIT" in FIGS. 2) 17-1 to 17-m, an APS transmitter 18, a switch 19, and a control table T1.

Note that when the transmission apparatus 10 performs WDM transmission using n wavelengths, the number m of individual APS units 17-1 to 17-m is set at a value smaller than n (m<n). Here, the entire APS unit 16 and the APS transmitter 18 serve as the entire switching unit 1a illustrated in FIG. 1.

The individual APS units 17-1 to 17-m and the APS transmitter 18 serve as the individual switching units 1b-1 to 1b-n illustrated in FIG. 1, and the switch controller 15 serves as the switch controller 1c illustrated in FIG. 1.

The DEMUX 11w receives a wavelength-division multiplexing optical signal (WDM optical signal) supplied from the West side and demultiplexes the received WDM optical signal into optical signals having the individual wavelengths. The DEMUX 11e receives a WDM optical signal supplied from the East side and demultiplexes the WDM optical signal into optical signals having the individual wavelengths.

The MUX 12w multiplexes optical signals of individual wavelengths outputted from the transmission terminators 14w-1 to 14w-n into a WDM optical signal that is outputted to the West side. The MUX 12e multiplexes optical signals of individual wavelengths outputted from the transmission terminators 14e-1 to 14e-n into a WDM optical signal that is outputted to the East side.

The reception terminators 13w-1 to 13w-n terminate the received optical signals of individual wavelengths outputted from the DEMUX 11w (including O/E conversion), detect failure occurrence in the optical signals of the individual wavelengths, and extract APS information. Then the reception terminators 13w-1 to 13w-n send failure information or the APS information to the switch controller 15.

The reception terminators 13e-1 to 13e-n terminate the received optical signals of individual wavelengths outputted from the DEMUX 11e (including O/E conversion), detect failure occurrence in the optical signals of the individual wavelengths, and extract APS information. Then the reception terminators 13e-1 to 13e-n send failure information or the APS information to the switch controller 15.

The transmission terminators 14w-1 to 14w-n terminate signals to be transmitted (including E/O conversion) and superimpose the APS information of the individual wavelengths sent from the APS transmitter 18 on the main optical signal of the corresponding wavelength to generate an optical signal that is sent to the MUX 12w.

The transmission terminators 14e-1 to 14e-n terminate signals to be transmitted (including E/O conversion) and superimpose the APS information of the individual wavelengths sent from the APS transmitter 18 on main optical signal of the corresponding wavelength to generate an optical signal that is sent to the MUX 12e.

The switch controller 15 receives the failure information and the APS information of the individual wavelengths that have been sent from the reception terminators 13w-1 to 13w-n and the reception terminators 13e-1 to 13e-n. Then, for first wavelengths to be collectively processed, the switch controller 15 sends to the entire APS unit 16 an instruction for performing a path-switching process simultaneously on the first wavelengths, in accordance with the above received information. Meanwhile, for a second wavelength to be individually processed, the switch controller 15 sends to one of the individual APS units 17-1 to 17-m an instruction for performing a path-switching process individually on the second wavelength.

The entire APS unit 16 performs a path-switching process (protection process) simultaneously on the first wavelengths that are designated by the switch controller 15. Meanwhile, the individual APS units 17-1 to 17-m each perform a path-switching process (a protection process) individually on the second wavelength that is designated by the switch controller 15.

The APS transmitter 18 sends the APS information determined by the entire APS unit 16 or the individual APS units 17-1 to 17-m, to the relevant transmission terminators of the transmission terminators 14w-1 to 14w-n and the transmission terminators 14e-1 to 14e-n.

The switch 19 configures a path by connecting an input signal and an output signal in accordance with an instruction issued from the entire APS unit 16 or the individual APS units 17-1 to 17-m. Further, the switch 19 sets a loop-back connection when a failure occurrence is detected.

Here, assignment of wavelengths to the entire APS unit 16 and the individual APS units 17-1 to 17-m is performed so that each of the entire APS unit 16 and the individual APS units 17-1 to 17-m performs a path-switching process on the assigned wavelength. Information on the above assignment is stored in the control table T1 so as to manage the assignment of wavelengths to the entire APS unit 16 and the individual APS units 17-1 to 17-m.

Further, for example, a transmission apparatus mentioned above may be configured using a processor such as a CPU (a central processing unit) and a memory for storing information such as APS information. In this case, for example, the entire APS unit and the individual APS units may be implemented using software.

FIG. 3 is a diagram illustrating a configuration example of APS (Automatic Protection Switching) information, according to an embodiment. The APS information includes, for example, four bytes of data, APS1 to APS4, each having one byte length.

In the first byte "APS1", a bridge request code is set to a field of first to fourth bits. The code "No Request" (hereinafter referred to as a "NR") is set as the bridge request code when path-switching is unnecessary (that is, in a state of normal operation). Meanwhile, the code "Signal Fail-Ring" (hereinafter referred to as a "SF-R") is set as the bridge request code when an optical signal is interrupted. Further, the code "Reverse Request-Ring" (hereinafter referred to as a "RR-R") is set as the bridge request code when responding to the code SF-R.

A value "L/S" indicating a "Long" path or a "Short" path is set to a field corresponding to a fifth bit. That is, when a faulty part is bypassed, "L" indicates a long path including a larger number of hops and "S" indicates a short path including a smaller number of hops.

A status is set to a field corresponding to sixth to eighth bits. For example, the status "idle" is set when the path-switching process is not performed, whereas the status "Bridge and Switch" is set when the path-switching process is performed.

In the second byte "APS2", an ID (identifier) identifying a transmission destination device is set to a field corresponding to first to eighth bits. In the third byte "APS3", an ID (identifier) identifying a transmission source device is set to a field corresponding to first to eighth bits.

In the fourth byte "APS4", the first bit is used for a batch flag that is newly prepared. For example, value "1" (ON) is set to a batch flag for a wavelength to be collectively processed, whereas value "0" (OFF) is set to a batch flag for a wavelength to be individually processed. A field corresponds to second to eighth bits is reserved. The APS information described above may be transmitted, for example, using an overhead of an HO ODU (Higher Order Optical channel Data Unit).

Next, operations of the transmission apparatus 10 will be described in detail by taking as an example a WDM ring network including four transmission apparatuses. Hereinafter, a transmission apparatus is also referred to as a "node".

Figure 4:
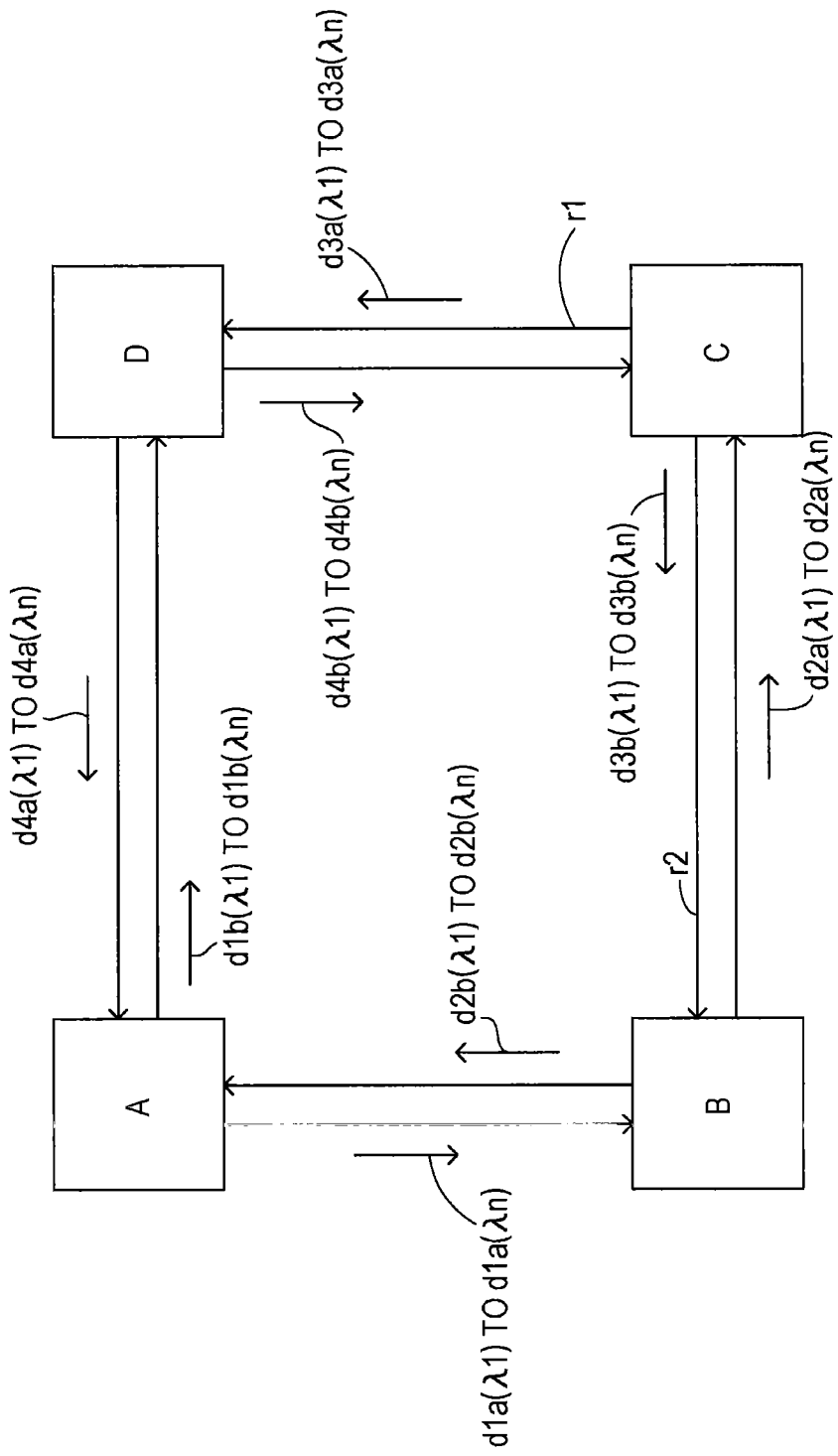
FIG. 4 is a diagram illustrating an example of a normal operation, according to an embodiment.

FIG. 4 is a diagram illustrating an example of a normal operation, according to an embodiment, and FIG. 5 is a diagram illustrating an example of APS information, according to an embodiment. The WDM ring network includes nodes A to D that are connected with each other in a ring topology including an outside ring r1 and an inside ring r2.

A transmission direction of the outside ring r1 of the WDM ring network is a counter-clockwise direction, whereas a transmission direction of the inside ring r2 is a clockwise direction. The WDM ring network is a network that transmits a WDM optical signal obtained by multiplexing optical signals having different wavelengths $\lambda 1$ to $\lambda n$.

In FIG. 5, for example, information item "$\lambda 1$: NR, A-D, 1" represents a piece of APS information, and "$\lambda 1$", "NR", "A", "D", and "1" indicates a wavelength, a bridge request code, a source node ID, a destination node ID, and a value of the batch flag, respectively.

Accordingly, in this case, the wavelength is $\lambda 1$, the bridge request code is NR (path-switching is unnecessary), the source node ID is A, the destination node ID is D, and the batch flag is 1 (path-switching is to be performed collectively). As for the other information items in FIG. 5, APS information is represented in the same manner.

Since no failures are occurring in the network in a normal operation state or in a default state, the nodes A to D transmit APS information including the code "NR" to the adjacent nodes for all the wavelengths $\lambda 1$ to $\lambda n$. Further, in the normal operation state or the default state, the batch flag is set at 1, and the path-switching process is assigned to the entire APS unit 16.

The node A transmits, to the node B, pieces of APS information $d1a(\lambda 1)$ to $d1a(\lambda n)$ through the outside ring r1, where the pieces of APS information $d1a(\lambda 1)$ to $d1a(\lambda n)$ indicate "$\lambda 1$: NR, A-B, 1" to "$\lambda n$: NR, A-B, 1", respectively.

At the same time, the node A transmits, to the node B, pieces of APS information d1$b$(λ1) to d1$b$(λn) through the inside ring r2, where the pieces of APS information d1$b$(λ1) to d1$b$(λn) indicate "λ1: NR, A-D, 1" to "λn: NR, A-D, 1", respectively.

The node B transmits, to the node C, pieces of APS information d2$a$(λ1) to d2$a$(λn) through the outside ring r1, where the pieces of APS information d2$a$(λ1) to d2$a$(λn) indicate "λ1: NR, B-C, 1" to "λn: NR, B-C, 1", respectively.

At the same time, the node B transmits, to the node A, pieces of APS information d2$b$(λ1) to d2$b$(λn) through the inside ring r2, where the pieces of APS information d2$b$(λ1) to d2$b$(λn) indicate "λ1: NR, B-A, 1" to "λn: NR, B-A, 1", respectively.

The node C transmits, to the node D, pieces of APS information d3$a$(λ1) to d3$a$(λn) through the outside ring r1, where the pieces of APS information d3$a$(λ1) to d3$a$(λn) indicate "λ1: NR, C-D, 1" to "λn: NR, C-D, 1", respectively.

At the same time, the node C transmits, to the node B, pieces of APS information d3$b$(λ1) to d3$b$(λn) through the inside ring r2, where the pieces of APS information d3$b$(λ1) to d3$b$(λn) indicate "λ1: NR, C-B, 1" to "λn: NR, C-B, 1", respectively.

The node D transmits, to the node A, pieces of APS information d4$a$(λ1) to d4$a$(λn) through the outside ring r1, where the pieces of APS information d4$a$(λ1) to d4$a$(λn) indicate "λ1: NR, D-A, 1" to "λn: NR, D-A, 1", respectively.

At the same time, the node D transmits, to the node C, pieces of APS information d4$b$(λ1) to d4$b$(λn) through the inside ring r2, where the pieces of APS information d4$b$(λ1) to d4$b$(λn) indicate "λ1: NR, D-C, 1" to "λn: NR, D-C, 1", respectively.

Next, operations performed when all the wavelengths λ1 to λn are interrupted will be described.

Figure 6:
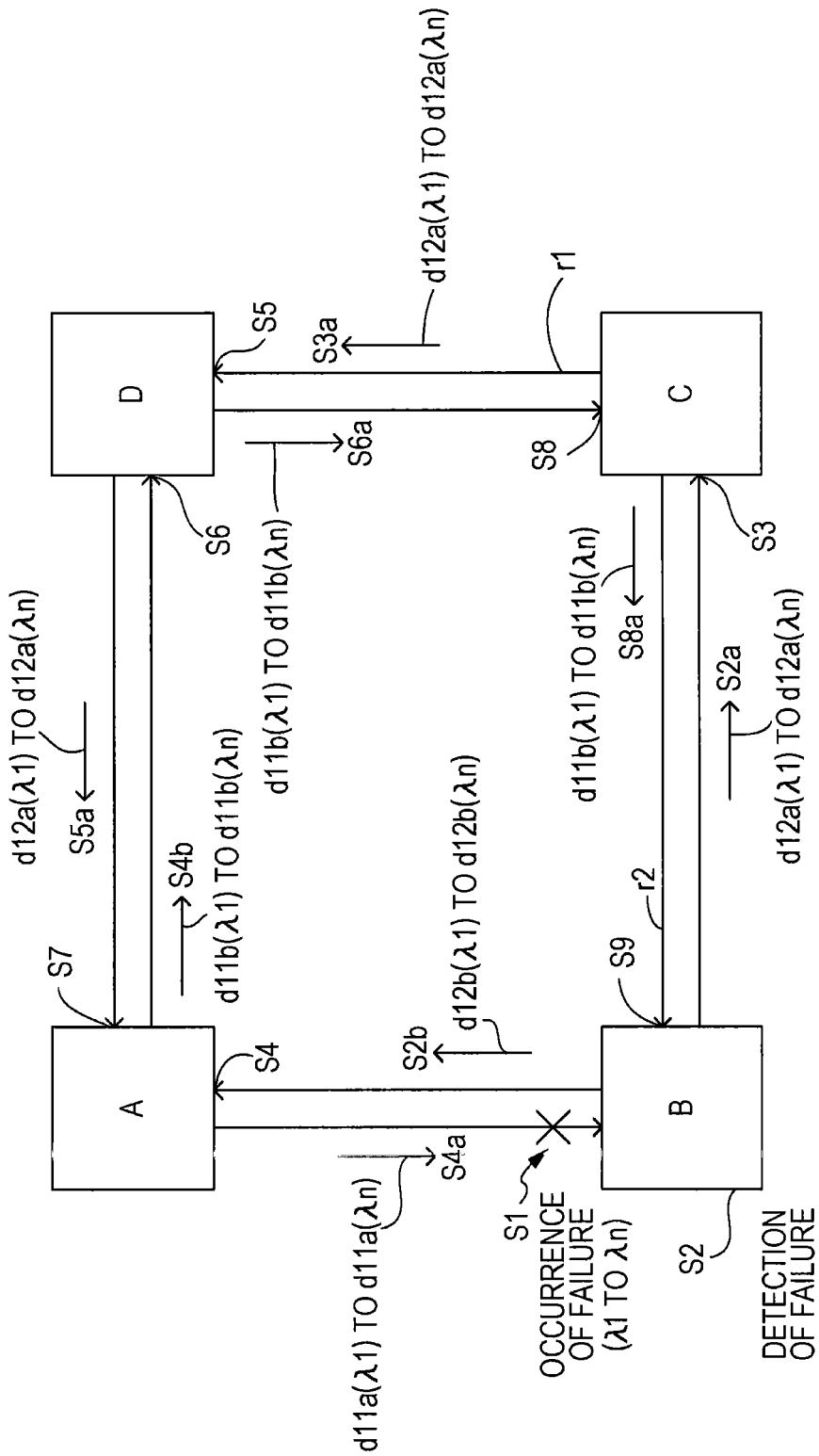
FIG. 6 is a diagram illustrating an example of an operation when failures have occurred for all the wavelengths, according to an embodiment.

FIG. 6 is a diagram illustrating an example of an operation when failures have occurred for all the wavelengths, according to an embodiment, and FIG. 7 is a diagram illustrating an example of APS information, according to an embodiment.

In operation S1, it is assumed that failures have occurred for all the wavelengths λ1 to λn on a segment from the node A to the node B along the outside ring r1 (for example, a connector of an optical fiber is loosened or the optical fiber is physically cut).

In operation S2, the switch controller 15 of the node B detects the failures. The entire APS unit 16 of the node B is activated, and the entire APS unit 16 monitors states of optical signals having the wavelengths λ1 to λn. When the entire APS unit 16 recognizes that all the wavelengths λ1 to λn have failed, the entire APS unit 16 determines content to be set to pieces of APS information for the wavelengths λ1 to λn and transmits the determined content to the APS transmitter 18.

The APS transmitter 18 of the node B generates pieces of APS information d12$a$(λ1) to d12$a$(λn) and d12$b$(λ1) to d12$b$(λn) for the wavelengths λ1 to λn, respectively, in accordance with the received determined content.

In operation S2$a$, the node B transmits, to the node C, the pieces of APS information that include the code SF-R destined for the node A in association with all the wavelengths. That is, the pieces of APS information d12$a$(λ1) to d12$a$(λn) indicates "λ1: SF-R, B-A, 1" to "λn: SF-R, B-A, 1", respectively.

In operation S2$b$, the node B transmits, to the node A, the code SF-R destined for the node A. The APS information d12$b$(λ1) to d12$b$(λn) transmitted by the node B indicate "λ1: SF-R, B-A, 1" to "λn: SF-R, B-A, 1", respectively.

In operation S3, upon receiving the pieces of APS information including the code SF-R destined for the node A, the node C activates the entire APS unit 16 thereof. The entire APS unit 16 monitors states of optical signals having the wavelengths λ1 to λn and recognizes that all the optical signals having wavelengths λ1 to λn have failed. The entire APS unit 16 sets, to the switch 19, a pass-through connection for passing through optical signals having the wavelengths λ1 to λn.

In operation S3$a$, the entire APS unit 16 of the node C instructs the APS transmitter 18 to pass through the received pieces of APS information d12$a$(λ1) to d12$a$(λn) without changing the content of the received pieces of APS information d12$a$(λ1) to d12$a$(λn). Then, the pieces of APS information d12$a$(λ1) to d12$a$(λn) are transmitted to the node D without changing them.

In operation S4, upon receiving the pieces of APS information including the code SF-R destined for the node A, the node A activates the entire APS unit 16 thereof and monitors states of optical signals having the wavelengths λ1 to λn. When the entire APS unit 16 recognizes that failures have occurred for all the wavelengths λ1 to λn, the entire APS unit 16 determines content to be set to pieces of APS information for the wavelengths λ1 to λn and sends the determined content to the APS transmitter 18.

The APS transmitter 18 of the node A generates pieces of APS information d11$a$(λ1) to d11$a$(λn) and pieces of APS information d11$b$(λ1) to d11$b$(λn) for the wavelengths λ1 to λn, respectively, in accordance with the received determined content.

In operation S4$a$, the node A transmits, to the node B, pieces of APS information including the code RR-R destined for the node B. In this case, the node A transmits the pieces of APS information d11$a$(λ1) to d11$a$(λn) that indicate "λ1: RR-R, A-B, 1" to "λn: RR-R, A-B, 1", respectively.

In operation S4$b$, the node A transmits, to the node D, pieces of APS information including the code SF-R destined for the node B. In this case, the node A transmits the pieces of APS information d11$b$(λ1) to d11$b$(λn) that indicate "λ1: SF-R, A-B, 1" to "λn: SF-R, A-B, 1", respectively.

In operation S5, upon receiving the pieces of APS information including the code SF-R destined for the node A, the node D activates the entire APS unit 16 thereof. Then, the entire APS unit 16 monitors states of optical signals having the wavelengths λ1 to λn and recognizes that failures have occurred in all the wavelengths λ1 to λn. The entire APS unit 16 instructs the switch 19 to pass through optical signals having the wavelengths λ1 to λn. Consequently, optical signals having the wavelengths λ1 to λn passes through the node D to the node A.

In operation S5$a$, the entire APS unit 16 of the node D instructs the APS transmitter 18 to pass through the received pieces of APS information d12$a$(λ1) to d12$a$(λn). Consequently, the pieces of APS information d12$a$(λ1) to d12$a$(λn) are transmitted to the node A without change.

In operation S6, the node D receives the pieces of APS information including the code SF-R destined for the node B.

In operation S6$a$, the entire APS unit 16 of the node D instructs the APS transmitter 18 to pass through the received pieces of APS information d11$b$(λ1) to d11$b$(λn), and the received pieces of APS information d11$b$(λ1) to d11$b$(λn) are transmitted to the node C without change.

In operation S7, the node A receives the pieces of APS information including the code SF-R destined for the node A. The entire APS unit 16 of the node A instructs the switch 19 to set a loop-back connection for performing a loop-back operation on optical signals having the wavelengths λ1 to λn. Consequently, optical signals that have the wavelengths λ1 to λn and have been transmitted from the node D undergo the loop-back operation and are transmitted back to the node D.

In operation S8, the node C receives the pieces of APS information including the code SF-R destined for the node B.

In operation S8a, the entire APS unit 16 of the node C instructs the APS transmitter 18 to pass through the received pieces of APS information d11b(λ1) to d11b(λn), and the received pieces of APS information d11b(λ1) to d11b(λn) are transmitted to the node B without change.

In operation S9, the node B receives the pieces of APS information including the code SF-R destined for the node B. The entire APS unit 16 of the node B instructs the switch 19 to set a loop-back connection for performing a loop-back operation on optical signals having the wavelengths λ1 to λn. Consequently, optical signals that have the wavelengths λ1 to λn and have been transmitted from the node C undergo the loop-back operation and are transmitted back towards the node A.

Figure 8:
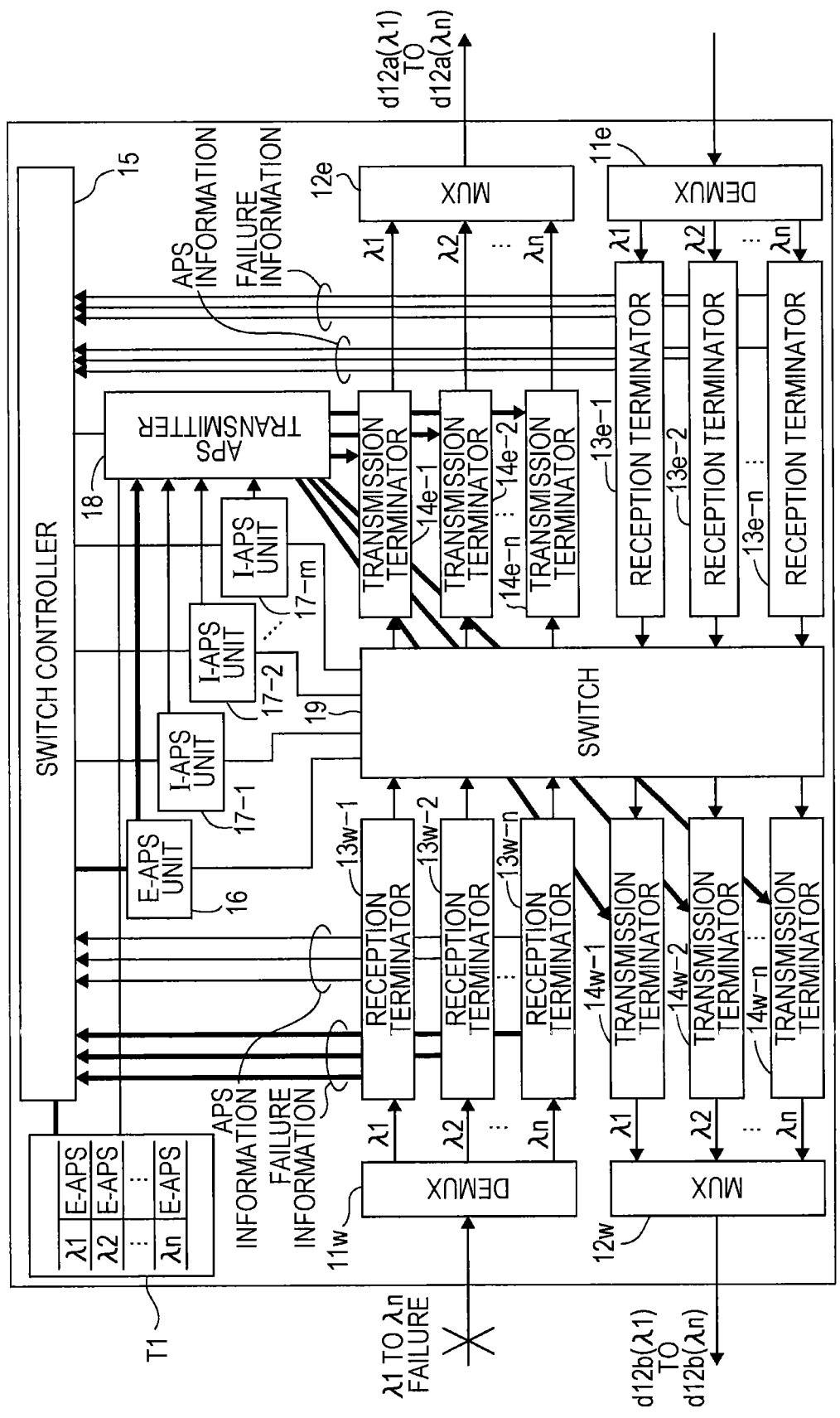
FIG. 8 is a diagram illustrating an example of an internal operation state of a node, according to an embodiment.
Figure 9:
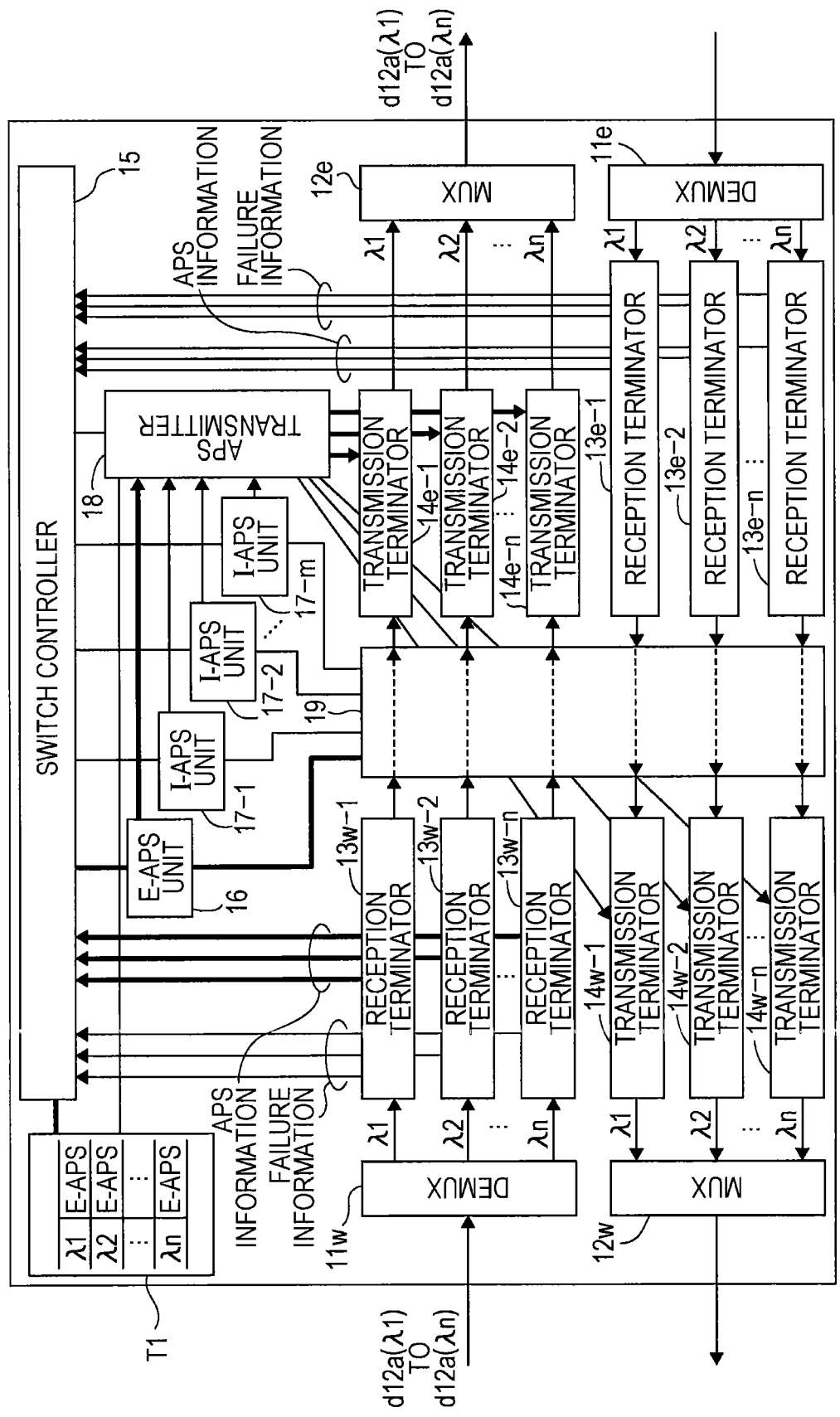
FIG. 9 is a diagram illustrating an example of an internal operation state of a node, according to an embodiment.
Figure 10:
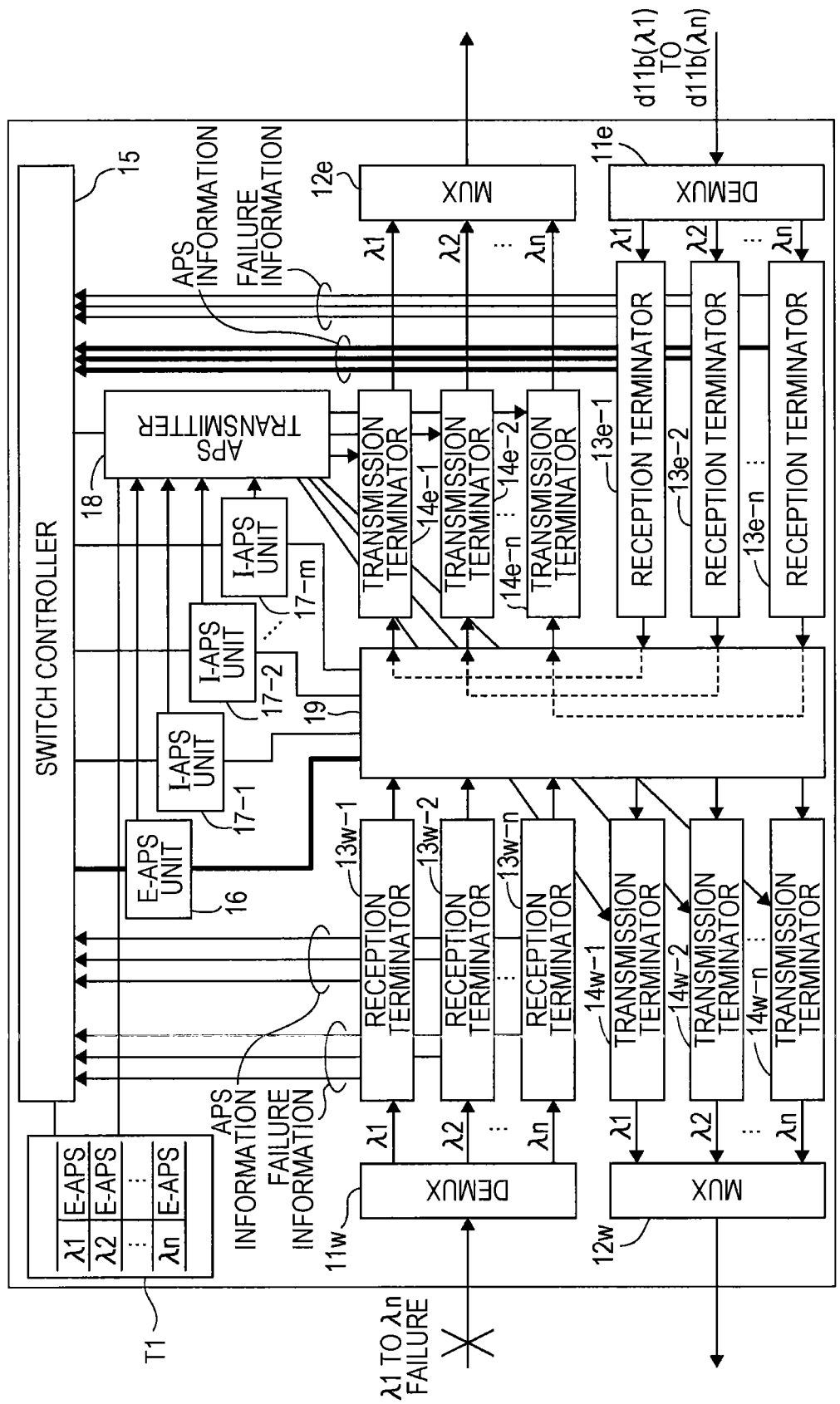
FIG. 10 is a diagram illustrating an example of an internal operation state of a node, according to an embodiment.

Next, internal operation states of nodes will be described. FIGS. 8 to 10 are diagrams illustrating internal operation states of the nodes.

FIG. 8 is a diagram illustrating an example of an internal operation state of a node, according to an embodiment. FIG. 8 illustrates an internal operation state of the node B when the node B performs the operations S2, S2a, and S2b depicted in FIG. 6. This is a case where failures have occurred for all the wavelengths used for an optical fiber, for example, due to the disconnection of the optical fiber.

In the case, the DEMUX 11w fails to receive optical signals since all the optical signals having the wavelengths λ1 to λn are interrupted. The reception terminators 13w-1 to 13w-n generate failure information indicating that optical signals having the respective wavelengths λ1 to λn are interrupted, and transmit the failure information to the switch controller 15.

The switch controller 15 recognizes failure occurrences for all the wavelengths λ1 to λn based on the failure information sent from the reception terminators 13w-1 to 13w-n, and the switch controller 15 activates the entire APS unit 16. At the same time, the switch controller 15 records, in the control table T1, information indicating that the wavelengths λ1 to λn are assigned to the entire APS unit 16 so that path-switching processes for switching paths transmitting optical signals having the wavelengths λ1 to λn are performed by the entire APS unit 16.

By providing the control table T1, it becomes easy to manage which wavelengths are to be processed by the entire APS unit 16 and which wavelengths are to be processed by the individual APS units 17-1 to 17-m. Further, by managing state of assignment of wavelengths to the entire APS unit 16 and the individual APS units 17-1 to 17-m using the control table T1, it becomes easy to select an available individual APS unit from among the individual APS units 17-1 to 17-m.

The entire APS unit 16 of a node determines content that is set to pieces of APS information to be transmitted to the other nodes, based on failure information detected by the node and a current operation state of the node, and the entire APS unit 16 notifies the APS transmitter 18 of the content of the determined pieces of APS information. In this example, the pieces of APS information each include a bridge request code of "SF-R" and a batch flag of "1".

The APS transmitter 18 generates pieces of APS information d12a(λ1) to d12a(λn) in accordance with the determined content, and sends the generated pieces of APS information d12a(λ1) to d12a(λn) to the transmission terminators 14e-1 to 14e-n, respectively. At the same time, the APS transmitter 18 generates pieces of APS information d12b(λ1) to d12b(λn) in accordance with the determined content, and sends the pieces of APS information d12b(λ1) to d12b(λn) to the transmission terminators 14w-1 to 14w-n, respectively.

The pieces of APS information d12a(λ1) to d12a(λn) are transmitted to the node C via the MUX 12e, and the pieces of APS information d12b(λ1) to d12b(λn) are transmitted to the node A via the MUX 12w.

FIG. 9 is a diagram illustrating an example of an internal operation state of a node, according to an embodiment. FIG. 9 illustrates an internal operation state of the node C when the node C performs the operations S3 and S3a depicted in FIG. 6. The reception terminators 13w-1 to 13w-n receive the pieces of APS information d12a(λ1) to d12a(λn), respectively, via the DEMUX 11w and sends the received pieces of APS information d12a(λ1) to d12a(λn) to the switch controller 15.

The switch controller 15 recognizes failure occurrences for all the wavelengths λ1 to λn based on the APS information sent from the respective reception terminators 13w-1 to 13w-n and activates the entire APS unit 16. At the same time, the switch controller 15 records, in the control table T1, information indicating that the wavelengths λ1 to λn are assigned to the entire APS unit 16 so that the entire APS unit 16 performs path-switching processes on paths transmitting optical signals having the wavelengths λ1 to λn.

The entire APS unit 16 provides the switch 19 with an instruction for setting a pass-through connection, and notifies the APS transmitter 18 of the content of the APS information to be transmitted. The APS transmitter 18 sends pieces of APS information d12a(λ1) to d12a(λn) to the transmission terminators 14e-1 to 14e-n, respectively.

The transmission terminators 14e-1 to 14e-n superimpose the respective pieces of APS information d12a(λ1) to d12a(λn) on the respective optical signals of different wavelengths that are outputted from the switch 19. The pieces of APS information d12a(λ1) to d12a(λn) are transmitted to the node D via the MUX 12e.

FIG. 10 is a diagram illustrating an example of an internal operation state of a node, according to an embodiment. FIG. 10 illustrates an internal operation state of the node B when the node B performs the operation S9 depicted in FIG. 6. The reception terminators 13e-1 to 13e-n receive pieces of APS information d11b(λ1) to d11b(λn), respectively, via the DEMUX 11e and send the respective pieces of APS information d11b(λ1) to d11b(λn) to the switch controller 15. The switch controller 15 notifies the entire APS unit 16 of the content of the pieces of APS information sent from the reception terminators 13e-1 to 13e-n.

The entire APS unit 16 sends, to the switch 19, an instruction for setting loop-back connections for all the wavelengths λ1 to λn. The transmission terminators 14e-1 to 14e-n output optical signals of different wavelengths which are outputted from the switch 19 and transmit the optical signals having the wavelengths λ1 to λn to the node C via the MUX 12e.

Next, an operation performed when a failure has occurred for a single wavelength will be described.

Figure 11:
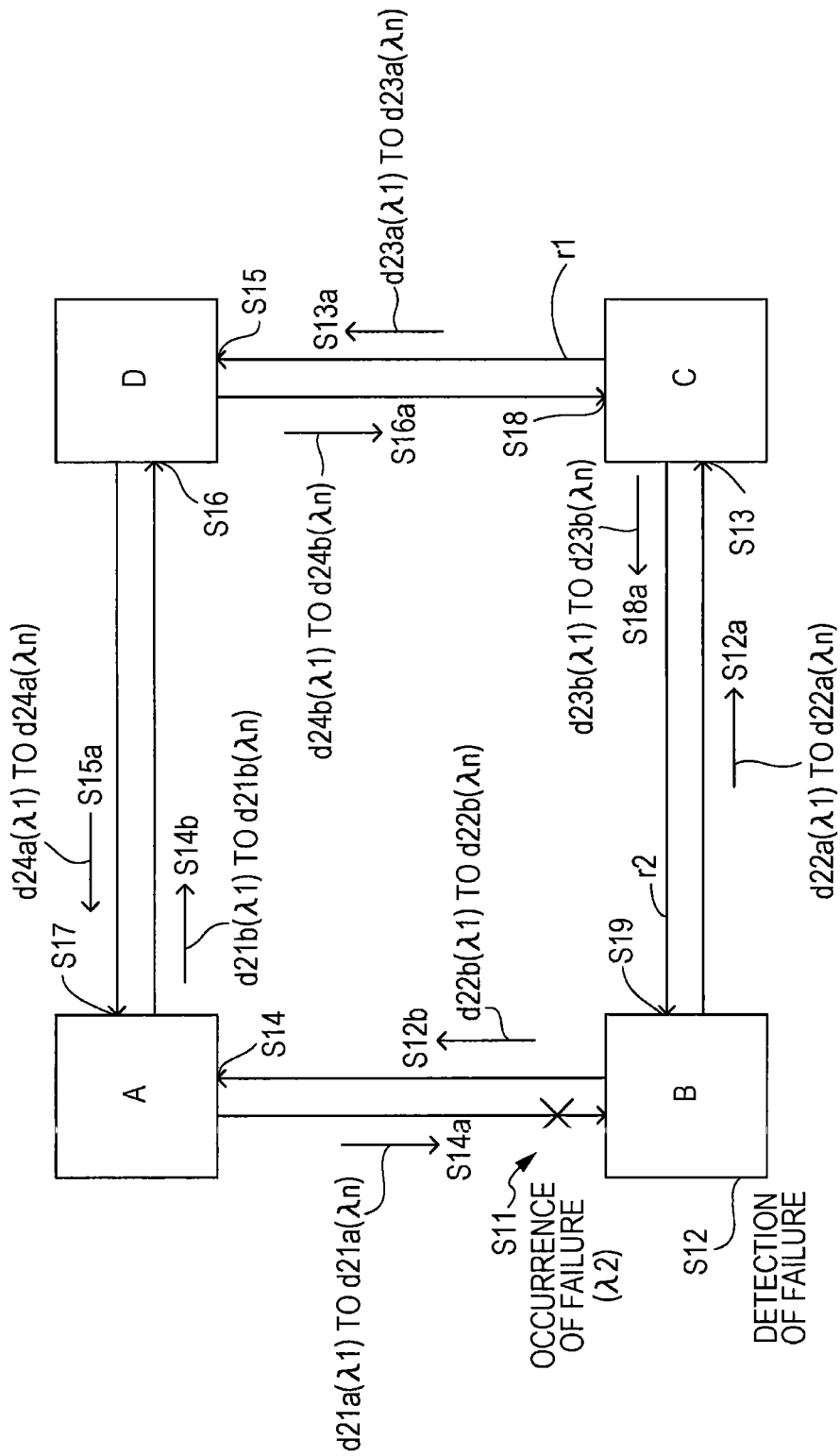
FIG. 11 is a diagram illustrating an example of operations performed when a failure has occurred for a single wavelength, according to an embodiment.

FIG. 11 is a diagram illustrating an example of an operation performed when a failure has occurred for a single wavelength, according to an embodiment, and FIG. 12 is a diagram illustrating an example of APS information, according to an embodiment.

In operation S11, it is assumed that a failure has occurred for a wavelength λ2 in a segment from the node A to the node B along the outside ring r1 (for example, a failure of an LD (Laser Diode) has occurred for a wavelength λ2).

In operation S12, upon detecting the failure occurrence for the wavelength λ2, the switch controller 15 of the node B activates one of the individual APS units 17-1 to 17-*m*. Hereinafter, it is assumed that the individual APS unit 17-1 is activated in each of the nodes. The individual APS unit 17-1 controls a state of an optical signal having the wavelength λ2. When the individual APS unit 17-1 recognizes that a failure has occurred for the wavelength λ2, the individual APS unit 17-1 determines content of the APS information for the wavelength λ2 and sends the determined content to the APS transmitter 18.

The APS transmitter 18 generates pieces of APS information d22*a*(λ1) to d22*a*(λn) and pieces of APS information d22*b*(λ1) to d22*b*(λn) by changing information on the wavelength λ2 based on the received determined content.

In operation S12*a*, the node B transmits, to the node C, the generated pieces of APS information that include the code SF-R destined for the node A in association with the wavelength λ2. That is, values "λ1: NR, B-C, 1", "λ2: SF-R, B-A, 0", "λ3: NR, B-C, 1" to "λn: NR, B-C, 1" are respectively set to the pieces of APS information d22*a*(λ1), d22*a*(λ2), d22*a*(λ3) to d22*a*(λn) that are transmitted from the node B.

In operation S12*b*, the node B transmits, to the node A, the generated pieces of APS information that include the code SF-R destined for the node A in association with the wavelength λ2. That is, values "λ1: NR, B-A, 1", "λ2: SF-R, B-A, 0", "λ3: NR, B-A, 1" to "λn: NR, B-A are respectively set to the pieces of APS information d22*b*(λ1), d22*b*(λ2), d22*b*(λ3) to d22*b*(λn) that are transmitted from the node B.

In operation S13, the node C receives the pieces of APS information that include the code SF-R destined for the node A in association with the wavelength λ2. The individual APS unit 17-1 of the node C is activated, and the individual APS unit 17-1 controls a state of an optical signal having the wavelength λ2 and recognizes that a failure has occurred for the wavelength λ2. The individual APS unit 17-1 sets, to the switch 19, a pass-through connection for passing through an optical signal having the wavelength λ2.

In operation S13*a*, the individual APS unit 17-1 of the node C instructs the APS transmitter 18 to pass through the APS information associated with the wavelength λ2 without change. At the same time, the pieces of APS information d23*a*(λ1) to d23*a*(λn) are transmitted from the node C to the node D where values "λ1: NR, C-D, 1", "λ2: SF-R, B-A, 0", "λ3: NR, C-D, 1" to "λn: NR, C-D, 1" are respectively set to the pieces of APS information d23*a*(λ1), d23*a*(λ2), d23*a*(λ3) to d23*a*(λn).

In operation S14, the node A receives the pieces of APS information that include the code SF-R destined for the node A in associated with the wavelength λ2. The individual APS unit 17-1 of the node A is activated, and the individual APS unit 17-1 monitors the state of an optical signal having the wavelength λ2. When the individual APS unit 17-1 recognizes that a failure has occurred for the wavelength λ2, the individual APS unit 17-1 determines content to be set to APS information for the wavelength λ2 and sends the determined content to the APS transmitter 18.

The APS transmitter 18 of the node A generates, for the wavelengths λ1 to λn, pieces of APS information d21*a*(λ1) to d21*a*(λn) and pieces of APS information d21*b*(λ1) to d21*b*(λn), based on the received determined content.

In operation S14*a*, the node A transmits, to the node B, the generated pieces of APS information that include the code RR-R destined for the node B in association with the wavelength λ2. That is, values "λ1: NR, A-B, 1", "λ2: RR-R, A-B, 0", "λ3: NR, A-B, 1" to "λn: NR, A-B, 1" are respectively set to the pieces of APS information d21*a*(λ1), d21*a*(λ2), d21*a*(λ3) to d21*a*(λn).

In operation S14*b*, the node A transmits, to the node D, the generated pieces of APS information that include the code SF-R destined for the node B in association with the wavelength λ2. That is, values "λ1: NR, A-D, 1", "λ2: SF-R, A-B, 0", "λ3: NR, A-D, 1" to "λn: NR, A-D, 1" are respectively set to the pieces of APS information d21*b*(λ1), d21*b*(λ2), d21*b*(λ3) to d21*b*(λn).

In operation S15, the node D receives the pieces of APS information that include the code SF-R destined for the node A in association with the wavelength λ2. The individual APS unit 17-1 of the node D is activated, and the individual APS unit 17-1 monitors the state of an optical signal having the wavelength λ2 and recognizes that a failure has occurred for the wavelength λ2. The individual APS unit 17-1 sets, to the switch 19, a pass-through connection for passing through an optical signal having the wavelength λ2.

In operation S15*a*, the individual APS unit 17-1 of the node D instructs the APS transmitter 18 to pass through the APS information associated with the wavelength λ2 without change. The pieces of APS information d24*a*(λ1) to d24*a*(λn) are transmitted from the node D to the node A, where values "λ1: NR, D-A, 1", "λ2: SF-R, B-A, 0", "λ3: NR, D-A, 1" to "λn: NR, D-A, 1" are respectively set to the pieces of APS information d24*a*(λ1), d24*a*(λ2), d24*a*(λ3) to d24*a*(λn).

In operation S16, the node D receives the pieces of APS information that include the code SF-R destined for the node B in association with the wavelength λ2.

In operation S16*a*, the individual APS unit 17-1 of the node D instructs the APS transmitter 18 to pass through the APS information associated with the wavelength λ2 without change. The pieces of APS information d24*b*(λ1) to d24*b*(λn) are transmitted from the node D to the node C where values "λ1: NR, D-C, 1", "λ2: SF-R, A-B, 0", "λ3: NR, D-C, 1" to "λn: NR, D-C, 1" are respectively set to the APS information d24*b*(λ1), d24*b*(λ2), d24*b*(λ3) to d24*b*(λn).

In operation S17, the node A receives the pieces of APS information that include the code SF-R destined for the node A in association with the wavelength λ2. The individual APS unit 17-1 of the node A sets, to the switch 19, a loop-back connection for performing a loop-back operation on an optical signal having the wavelength λ2.

In operation S18, the node C receives the pieces of APS information that include the code SF-R destined for the node B in association with the wavelength λ2.

In operation S18*a*, the individual APS unit 17-1 of the node C instructs the APS transmitter 18 to pass through the APS information associated with the wavelength λ2 without change. The pieces of APS information d23*b*(λ1) to d23*b*(λn) are transmitted from the node C to the node B where values "λ1: NR, C-B, 1", "λ2: SF-R, A-B, 0", "λ3: NR, C-B, 1" to "λn: NR, C-B, 1" are respectively set to the pieces of APS information d23*b*(λ1), d23*b*(λ2), d23*b*(λ3) to d23*b*(λn).

In operation S19, the node B receives the pieces of APS information that include the code SF-R destined for the node B in association with the wavelength λ2. The individual APS unit 17-1 of the node B sets, to the switch 19, a loop-back connection for performing a loop-back operation on an optical signal having the wavelength λ2.

Figure 13:
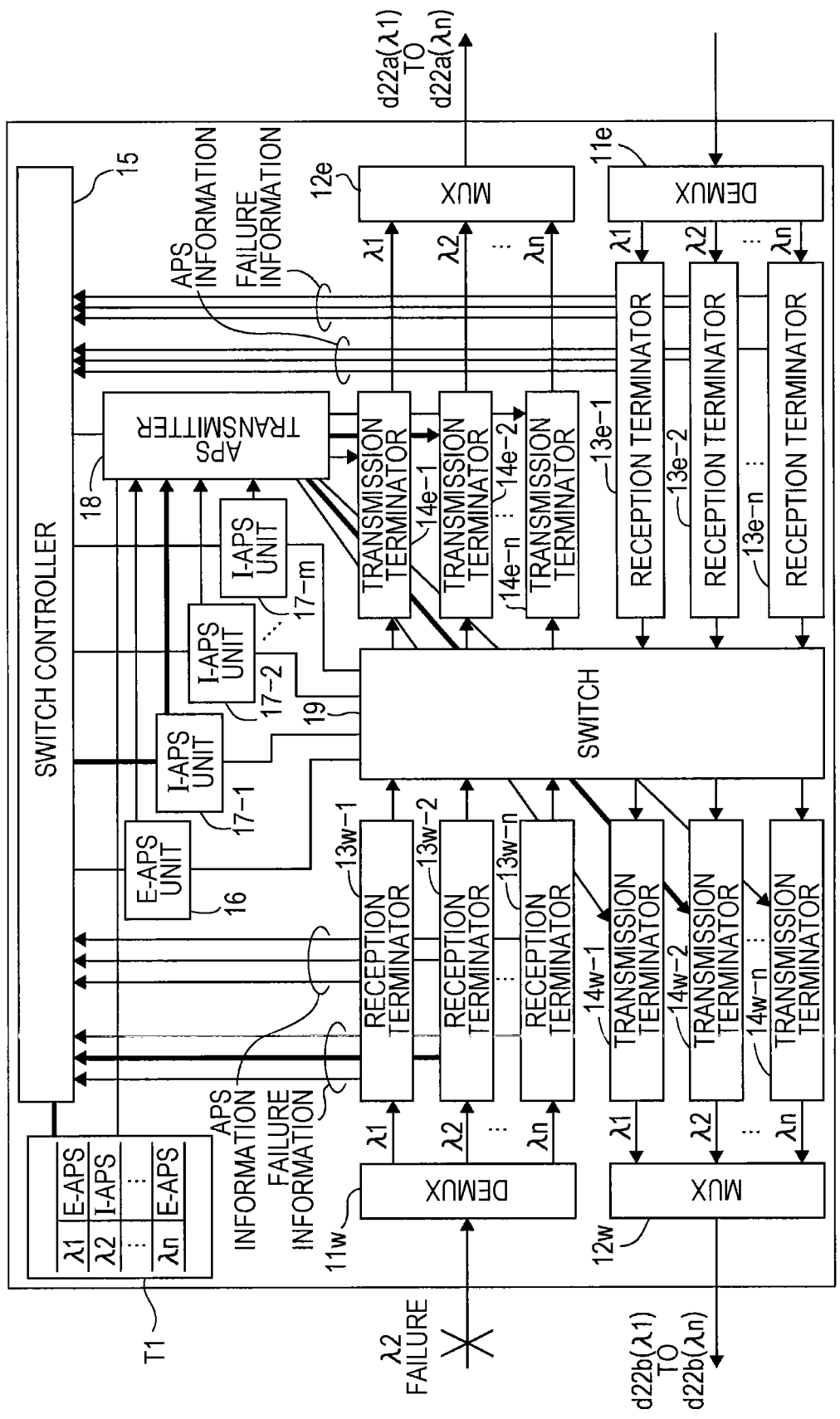
FIG. 13 is a diagram illustrating an example of an internal operation state of a node, according to an embodiment.
Figure 14:
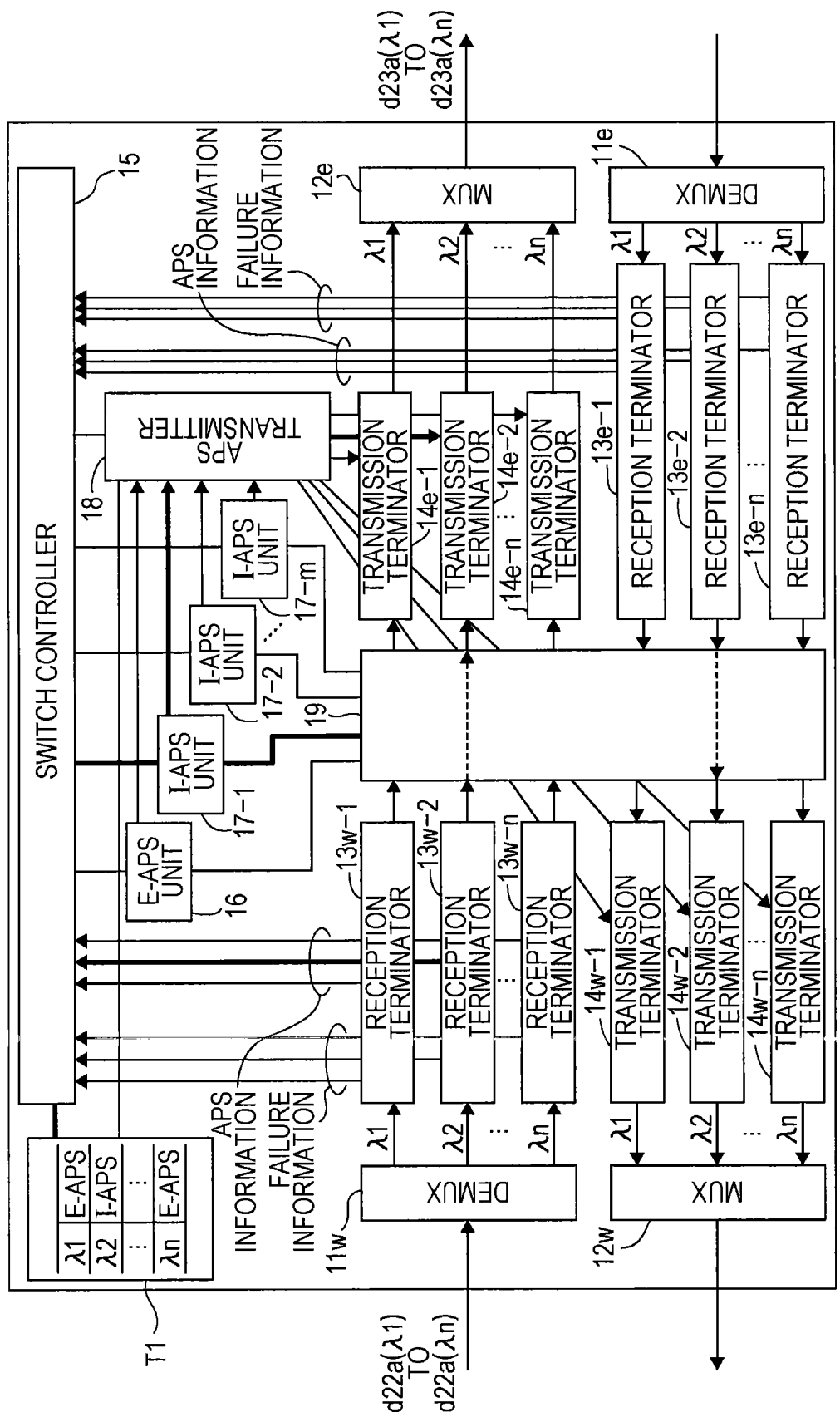
FIG. 14 is a diagram illustrating an example of an internal operation state of a node, according to an embodiment.
Figure 15:
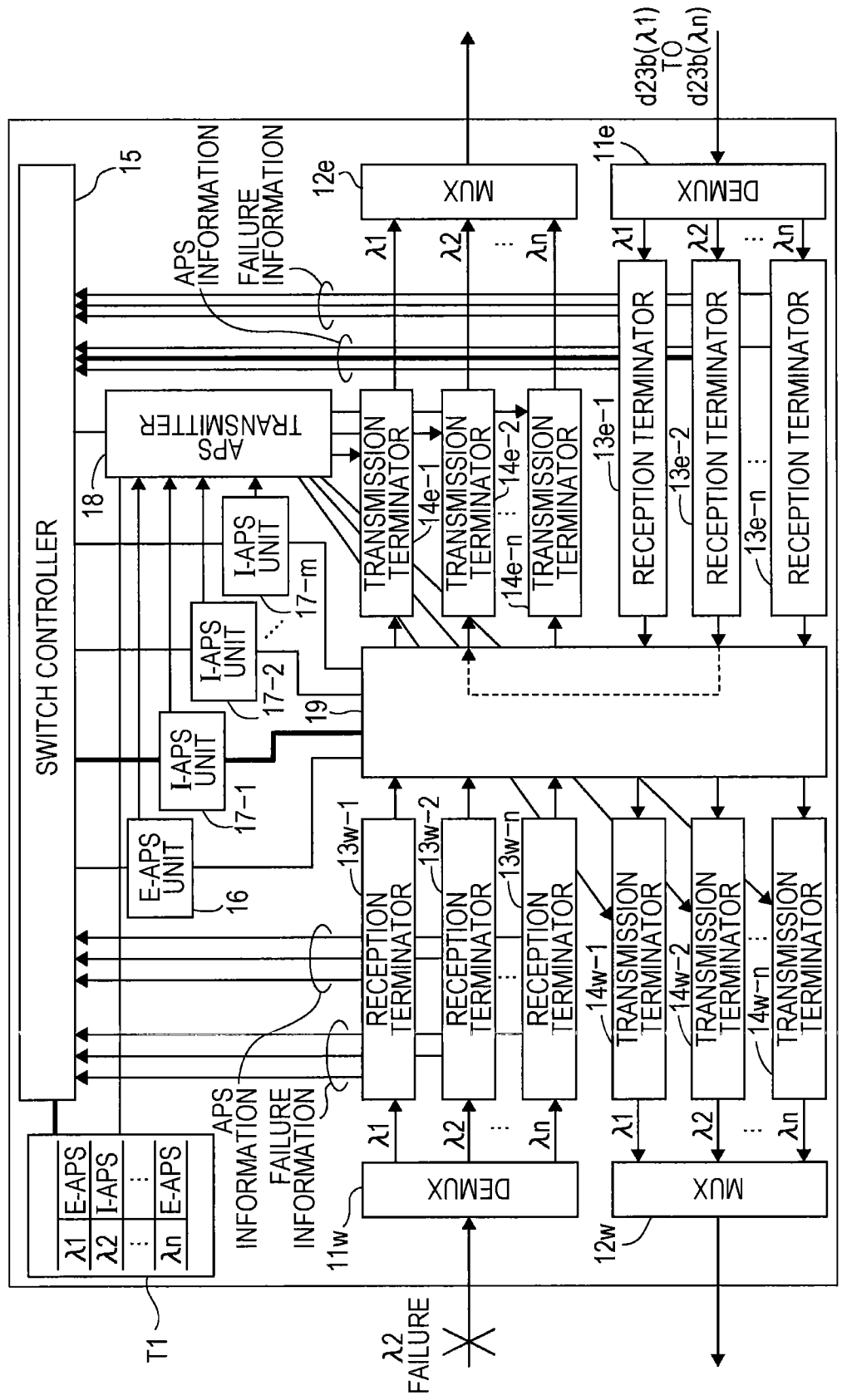
FIG. 15 is a diagram illustrating an example of an internal operation state of a node, according to an embodiment.

Next, other internal operation states of the nodes will be described. FIGS. 13 to 15 are diagrams illustrating other internal operation states of the nodes.

FIG. 13 is a diagram illustrating an example of an internal operation state of a node, according to an embodiment. FIG. 13 illustrates internal operation states of the node B when the node B performs the operations S12, S12*a*, and S12*b* depicted in FIG. 11. The FIG. 13 illustrates a case where at least one failure has occurred for a subset of wavelengths included in all the wavelengths used for optical signals flowing through the optical fiber, for example, due to a failure of a laser, where the number of wavelengths included in the subset of wavelengths is smaller than the number of all the wavelengths.

In this example, the DEMUX 11w fails to receive an optical signal having the wavelength λ2 since the optical signal of the wavelength λ2 is interrupted. The reception terminator 13w-2 generates failure information indicating that the wavelength λ2 is interrupted and sends the generated failure information to the switch controller 15.

The switch controller 15 recognizes the failure occurrence for the wavelength λ2, based on the failure information sent from the reception terminator 13w-2. The switch controller 15 searches the control table T1 for an available one of individual APS units.

The switch controller 15 activates the available one of individual APS units (for example, the individual APS unit 17-1). At the same time, the switch controller 15 records, in the control table T1, information indicating that the wavelength λ2 is assigned to the individual APS unit 17-1 so that the individual APS unit 17-1 performs a path-switching process on the wavelength λ2.

The individual APS unit 17-1 of the node B determines content of APS information that is to be transmitted to the other nodes, based on failure information received by the node B and a current operation state of the node B, and transmits the determined content of the APS information to the APS transmitter 18. In this case, the APS information includes value "SF-R" as the bridge request code and value "0" as the batch flag.

The APS transmitter 18 generates pieces of APS information d22a(λ1) to d22a(λn) based on the determined content and transmits the generated pieces of APS information d22a (λ1) to d22a(λn) to the transmission terminators 14e-1 to 14e-n, respectively. At the same time, the APS transmitter 18 generates pieces of APS information d22b(λ1) to d22b(λn) based on the determined content and transmits the generated pieces of APS information d22b(λ1) to d22b(λn) to the transmission terminators 14w-1 to 14w-n, respectively.

The pieces of APS information d22a(λ1) to d22a(λn) are transmitted from the MUX 12e to the node C and the pieces of APS information d22b(λ1) to d22b(λn) is transmitted from the MUX 12w to the node A.

FIG. 14 is a diagram illustrating an example of an internal operation state of a node, according to an embodiment. FIG. 14 illustrates the internal operation state of the node C when the node C performs the operations S13 and S13a depicted in FIG. 11. The reception terminators 13w-1 to 13w-n receive pieces of APS information d22a(λ1) to d22a(λn), respectively, via the DEMUX 11w and send the received pieces of APS information d22a(λ1) to d22a(λn) to the switch controller 15.

The switch controller 15 recognizes a failure occurrence for the wavelength λ2 based on the pieces of APS information sent from the reception terminators 13w-1 to 13w-n and activates the individual APS unit 17-1. At the same time, the switch controller 15 records, in the control table T1, information indicating that the wavelength λ2 is assigned to the individual APS unit 17-1 so that the individual APS unit 17-1 performs a path-switching process on a path transmitting an optical signal having the wavelength λ2.

The individual APS unit 17-1 sends, to the switch 19, an instruction for setting a pass-through connection for passing through an optical signal having the wavelength λ2, and determines content of APS information that is to be transmitted to the other nodes. The individual APS unit 17-1 sends the determined content of the APS information to the APS transmitter 18. The APS transmitter 18 generates pieces of APS information d23a(λ1) to d23a(λn) based on the determined content, and sends the APS information d23a(λ1) to d23a(λn) to the transmission terminators 14e-1 to 14e-n, respectively.

The transmission terminators 14e-1 to 14e-n superimpose the pieces of APS information d23a(λ1) to d23a(λn), respectively, on the respective optical signals having the different wavelengths that are outputted from the switch 19. The pieces of APS information d23a(λ1) to d23a(λn) are transmitted via the MUX 12e to the node D.

FIG. 15 is a diagram illustrating an example of an internal operation state of a node, according to an embodiment. FIG. 15 illustrates the internal state of the node B when the node B performs the operation S19 depicted in FIG. 11. The reception terminators 13e-1 to 13e-n receive the pieces of APS information d23b(λ1) to d23b(λn), respectively, via the DEMUX 11e, and send the received pieces of APS information d23b(λ1) to d23b(λn) to the switch controller 15. The switch controller 15 notifies the individual APS unit 17-1 of content of the pieces of APS information sent from the reception terminators 13e-1 to 13e-n, to.

The individual APS unit 17-1 sends, to the switch 19, an instruction for setting a loop-back connection for performing a loop-back operation on a path transmitting an optical signal having the wavelength λ2. The transmission terminator 14e-2 outputs an optical signal having the wavelength λ2 that is outputted from the switch 19, and the transmission terminator 14e-2 transmits the optical signal having the wavelength λ2 to the node C via the MUX 12e.

Next, an operation performed when multiple failures have occurred will be described.

Figure 16:
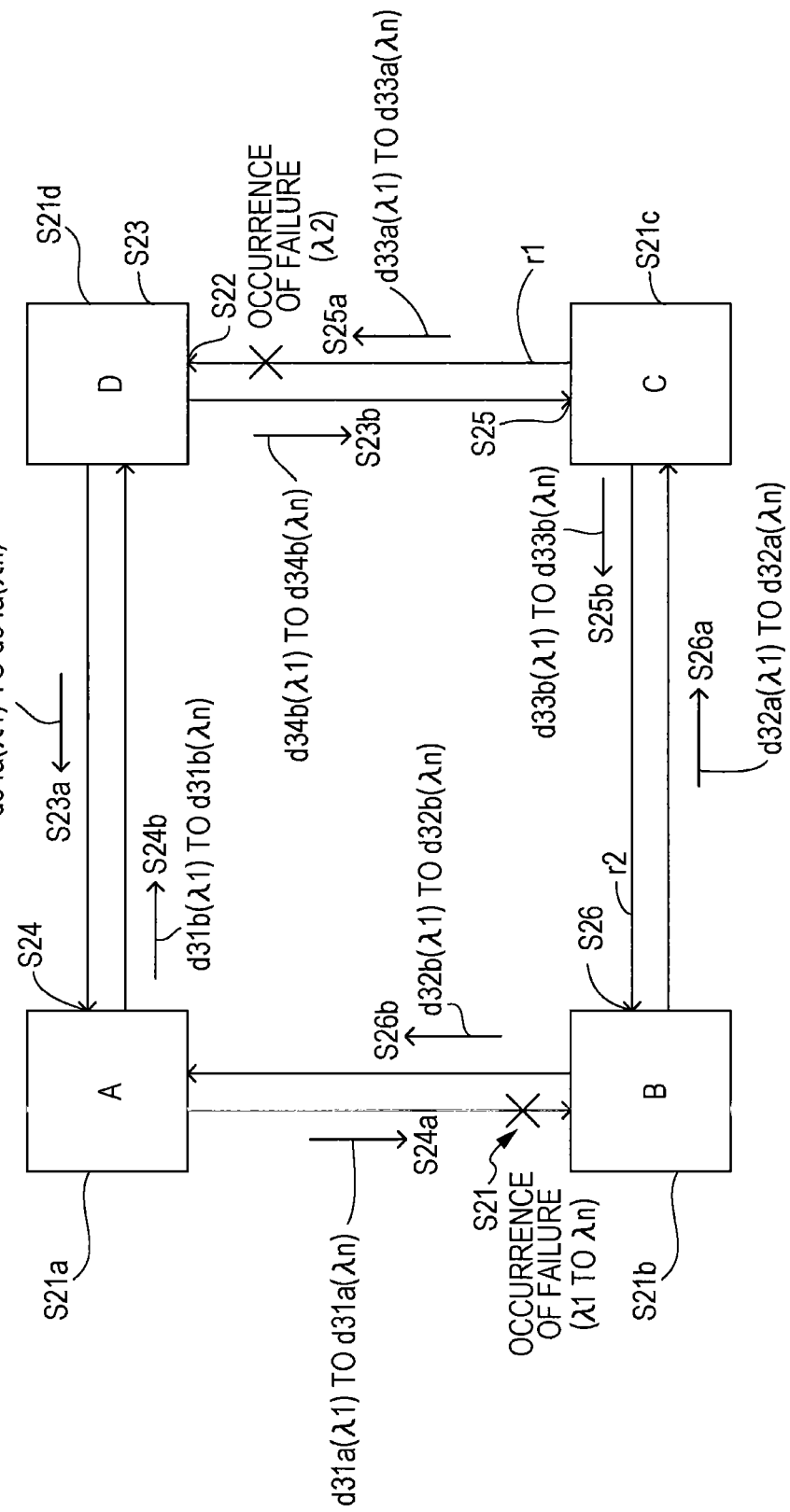
FIG. 16 is a diagram illustrating an example of operations performed when multiple failures have occurred, according to an embodiment.

FIG. 16 is a diagram illustrating an example of operations performed when multiple failures have occurred, according to an embodiment, and FIG. 17 is a diagram illustrating an example of APS information, according to an embodiment.

In operation S21, failures have occurred for all the wavelengths λ1 to λn at an segment from the node A to the node B along the outside ring r1.

In operation S21a, the node A is performing loop-back operations on optical signals having the wavelengths λ1 to λn.

In operation S21b, the node B is performing loop-back operations on optical signals having the wavelengths λ1 to λn.

In operation S21c, the node C is performing pass-through operations on optical signals having the wavelengths λ1 to λn.

In operation S21d, the node D is performing pass-through operations on optical signals having the wavelengths λ1 to λn.

In operation S22, a failure occurs for the wavelength λ2 at a segment from the node C to the node D along the outside ring r1, in addition to the failures that have occurred for all the wavelengths in operation S21.

In operation S23, the node D detects a failure occurrence for the wavelength λ2, processes an optical signal having the wavelength λ2 using the individual APS unit 17-1, and performs a loopback operation on the optical signal having the wavelength λ2, where optical signals having wavelengths other than the wavelength λ2 are passed through the node D.

In operation S23a, the node D transmits, to the node A, pieces of APS information that include the code SF-R destined for the node C in association with the wavelength λ2, where values "λ1: SF-R, B-A, 1", "λ2: SF-R, D-C, 0", and "λ3: SF-R, B-A, 1" to "λn: SF-R, B-A, 1" are respectively set to the pieces of APS information d34a(λ1), d34a(λ2), d34a(λ3) to d34a(λn).

In operation S23b, the node D transmits, to the node C, pieces of APS information that include the code SF-R destined for the node C in association with the wavelength $\lambda 2$, where values "$\lambda 1$: SF-R, A-B, 1", "$\lambda 2$: SF-R, D-C, 0", and "$\lambda 3$: SF-R, A-B, 1" to "$\lambda n$: SF-R, A-B, 1" are respectively set to the pieces of APS information d34b ($\lambda 1$), d34b ($\lambda 2$), and d34b ($\lambda 3$) to ($\lambda n$).

In operation S24, the node A receives the pieces of APS information that include the code SF-R destined for the node C and the batch flag "0" in association with the wavelength $\lambda 2$, that is, the piece of APS information d34a($\lambda 2$), and processes an optical signal having the wavelength $\lambda 2$ using the individual APS unit 17-1.

In operation S24a, the node A transmits, to the node B, pieces of APS information d31a ($\lambda 1$) to ($\lambda n$) that include a batch flag "0" in association with the wavelength $\lambda 2$, where values "$\lambda 1$: RR-R, A-B, 1", "$\lambda 2$: RR-R, A-B, 0", and "$\lambda 3$: RR-R, A-B, 1" to "$\lambda n$: RR-R, A-B are set respectively to the pieces of APS information d31a ($\lambda 1$) to ($\lambda n$).

In operation S24b, the node A transmits, to the node D, pieces of APS information d31b($\lambda 1$) to d31b($\lambda n$) that include the batch flag "0" in association with the wavelength $\lambda 2$, where values "$\lambda 1$: SF-R, A-B, 1", "$\lambda 2$: SF-R, A-B, 0", and "$\lambda 3$: SF-R, A-B, 1" to "$\lambda n$: SF-R, A-B are respectively set to the pieces of APS information d31b($\lambda 1$) to d31b($\lambda n$).

In operation S25, the node C receives the pieces of APS information that include the code SF-R destined for the node C and the batch flag "0" in association with the wavelength $\lambda 2$, that is, the piece of APS information d34b($\lambda 2$), and processes an optical signal having the wavelength $\lambda 2$ using the individual APS unit 17-1. The node C performs a loop-back operation on an optical signal having the wavelength $\lambda 2$.

In operation S25a, the node C transmits, to the node D, pieces of APS information d33a($\lambda 1$) to d33a($\lambda n$) that include the code RR-R destined for the node D in association with the wavelength $\lambda 2$, where values "$\lambda 1$: SF-R, B-A, 1", "$\lambda 2$: RR-R, C-D, 0", and "$\lambda 3$: SF-R, B-A, 1" to "$\lambda n$: SF-R, B-A, 1" are respectively set to the pieces of APS information d33a($\lambda 1$) to d33a($\lambda n$).

In operation S25b, the node C transmits, to the node B, pieces of APS information d33b($\lambda 1$) to d33b($\lambda n$) that include the code SF-R destined for the node D in association with the wavelength $\lambda 2$, where values "$\lambda 1$: SF-R, A-B, 1", "$\lambda 2$: SF-R, C-D, 0", and "$\lambda 3$: SF-R, A-B, 1" to "$\lambda n$: SF-R, A-B, 1" are respectively set to the pieces of APS information d33b($\lambda 1$) to d33b($\lambda n$).

In operation S26, the node B receives the pieces of APS information d33b($\lambda 1$) to d33b($\lambda n$) that include the code SF-R destined for the node D and the batch flag "0" in association with the wavelength $\lambda 2$, that is, a piece of APS information d33b($\lambda 2$), and processes an optical signal having the wavelength $\lambda 2$ using the individual APS unit 17-1.

In operation S26a, the node B transmits, to the node C, pieces of APS information d32a($\lambda 1$) to d32a($\lambda n$) that include the batch flag "0" in association with the wavelength $\lambda 2$, where values "$\lambda 1$: SF-R, B-A, 1", "$\lambda 2$: SF-R, B-A, 0", and "$\lambda 3$: SF-R, B-A, 1" to "$\lambda n$: SF-R, B-A, 1" are respectively set to the pieces of APS information d32a($\lambda 1$) to d32a($\lambda n$).

In operation S26b, the node B transmits, to the node A, pieces of APS information d32b($\lambda 1$) to d32b($\lambda n$) that include the batch flag "0" in association with the wavelength $\lambda 2$, where values "$\lambda 1$: SF-R, B-A, 1", "$\lambda 2$: SF-R, B-A, 0", and "$\lambda 3$: SF-R, B-A, 1" to "$\lambda n$: SF-R, B-A, 1" are respectively set to the pieces of APS information d32b($\lambda 1$) to d32b($\lambda n$).

Next, an internal operation state of a node will be described.

FIG. 18 is a diagram illustrating an example of an internal operation state of a node, according to an embodiment. FIG. 18 illustrates an internal operation state of the node D when the node D performs the operations S23, S23a, and S23b depicted in FIG. 16.

In this example, the DEMUX 11w of the node D fails to receive an optical signal having the wavelength $\lambda 2$ since the optical signal having the wavelength $\lambda 2$ has been interrupted. The reception terminator 13w-2 generates failure information indicating that an optical signal having wavelength $\lambda 2$ is interrupted, and sends the failure information to the switch controller 15.

The switch controller 15 of the node D recognizes a failure has occurred for the wavelength $\lambda 2$ based on the failure information sent from the reception terminator 13w-2 and activates the individual APS unit 17-1. At the same time, the switch controller 15 records, in the control table T1, information indicating that the wavelength $\lambda 2$ is assigned to the individual APS unit 17-1 so that the individual APS unit 17-1 performs a path-switching process on the wavelength $\lambda 2$.

The individual APS unit 17-1 of the node D determines content to be set to APS information and sends the determined content of the APS information to the APS transmitter 18. The APS transmitter 18 generates pieces of APS information d34a ($\lambda 1$) to d34a($\lambda n$) based on the determined content and sends the generated pieces of APS information d34a($\lambda 1$) to d34a ($\lambda n$) to the transmission terminators 14e-1 to 14e-n, respectively. At the same time, the APS transmitter 18 generates pieces of APS information d34b($\lambda 1$) to d34b($\lambda n$) and sends the generated pieces of APS information d34b($\lambda 1$) to d34b ($\lambda n$) to the transmission terminators 14w-1 to 14w-n, respectively.

The pieces of APS information d34a($\lambda 1$) to d34a($\lambda n$) are transmitted to the node A via the MUX 12e, and the pieces of APS information d34b ($\lambda 1$) to ($\lambda n$) are transmitted to the node C via the MUX 12w.

Next, an operation performed when multiple failures have occurred will be described. In this case, the switch controller 15 receives pieces of APS information sent from the reception terminators 13w-1 to 13w-n, and recognizes that only a piece of APS information associated with wavelength $\lambda 2$ has the batch flag "0".

The switch controller 15 searches the control table T1 for an available individual APS unit, and assigns, for example, the individual APS unit 17-1 to the wavelength $\lambda 2$ as an available individual APS unit. Thereafter, the switch controller 15 sends the failure information and the APS information to the individual APS unit 17-1 and instructs the individual APS unit 17-1 to perform a path-switching process on the wavelength $\lambda 2$.

At the same time, the switch controller 15 instructs the entire APS unit 16 to perform path-switching processes on wavelengths other than the wavelength $\lambda 2$. The switch controller 15 records, in the control table T1, information indicating that the wavelength $\lambda 2$ is assigned to the individual APS unit 17-1 and the other wavelengths are assigned to the entire APS unit 16.

The entire APS unit 16 of the node D determines pieces of APS information to be transmitted based on the failure information, the APS information, and a current state of the node D, and instructs the APS transmitter 18 to transmit the determined pieces of APS information associated with wavelengths other than the wavelength $\lambda 2$.

Meanwhile, upon receiving pieces of APS information that include the bridge request code "SF-R" destined for the node D, the entire APS unit 16 of the node D instructs the switch 19 to perform loop-back operations on optical signals having wavelengths other than the wavelength λ2. When the bridge request code "SF-R" included in the piece of APS information is destined for a node other than the node D, the entire APS unit 16 instructs the switch 19 to pass through optical signals having wavelengths other than the wavelength λ2.

The individual APS unit 17-1 determines a piece of APS information to be transmitted based on the failure information, the received APS information, and the current state of the node D, and instructs the APS transmitter 18 to transmit the determined piece of APS information in association with the wavelength λ2.

Meanwhile, for example, upon receiving a piece of APS information that includes the bridge request code "SF-R" destined for node ID in association with the wavelength λ2, the individual APS unit 17-1 instructs the switch 19 to perform a loop-back operation on an optical signal having the wavelength λ2. When the bridge request code "SF-R" included in the piece of APS information is not destined for the node D, the individual APS unit 17-1 instructs the switch 19 to pass through an optical signal having wavelength λ2.

Next, description will be given of a case where a plurality of wavelengths are collected as a wavelength group and selection between the entire switching unit and the individual switching units is performed in units of the wavelength group.

Figure 19:
FIG. 19 is a diagram illustrating an example of a group configuration table, according to an embodiment.

FIG. 19 is a diagram illustrating an example of a group configuration table, according to an embodiment. A group configuration table T2 manages grouping of the wavelengths.

The group configuration table T2, for example, includes a group G1 including the wavelengths λ1 and λ2, a group G2 including the wavelengths λ3, λ5, and λ6, and a group G3 including the wavelengths λ4, λ7, λ8, and λ9. In this way, each of the groups includes a plurality of wavelengths being used for optical signals flowing through the optical fiber.

Here, it is assumed that there are provided a plurality of entire APS units 16 (or a plurality of entire switching units). The switch controller 15, upon receiving failure information from reception terminators, refers to the group configuration table T2. When failures have occurred for all the wavelengths included in a wavelength group, the switch controller 15 assigns an entire APS unit 16 to all the wavelengths included in the wavelength group and instructs the entire APS unit 16 to perform path-switching processes on paths transmitting optical signals having the wavelengths included in the wavelength group.

Furthermore, when at least one failure has occurred for a subset of wavelengths included in the wavelength group where the number of wavelengths included in the subset of wavelengths is smaller than the number of the wavelengths included in the wavelength group, the switch controller 15 assigns one of the individual APS units 17-1 to 17-m to each of the subset of wavelengths and instructs the one of the individual APS units 17-1 to 17-m to perform a path-switching process on the each of the subset of wavelengths. The content of the group configuration table T2 may be set in advance, for example, by using a control terminal or a network management system.

As described above, the group configuration table T2 for managing the correspondence relationship between wavelength groups and wavelengths is provided, and when failures have occurred for all the wavelengths in one of the wavelength groups, path-switching processes on the failed wavelengths are assigned to the entire APS unit 16, whereas when at least one failure has occurred for a portion (a subset) of the wavelengths included in one of the wavelength groups, a path-switching process on each of the portion of the wavelengths is assigned to one of the individual APS units 17-1 to 17-m. In this way, by grouping an arbitrary set of wavelengths, a path-switching process may be flexibly performed on each of different wavelengths.

Figure 20:
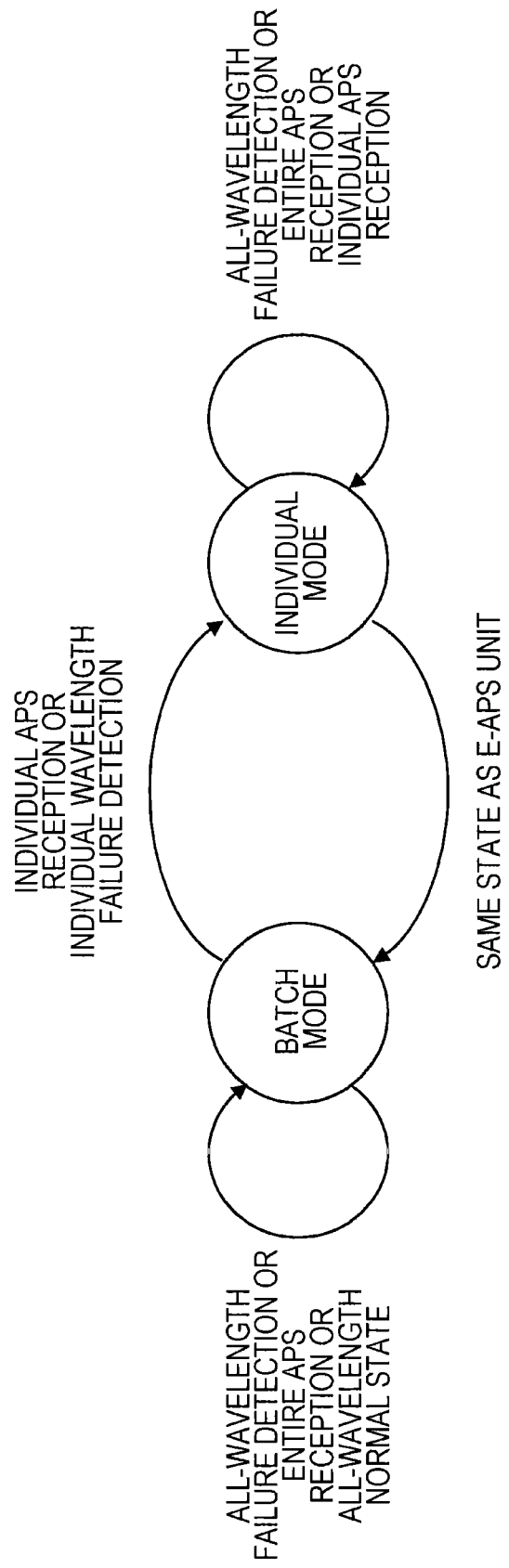
FIG. 20 is a diagram illustrating an example of state transition of wavelengths, according to an embodiment.

FIG. 20 is a diagram illustrating an example of state transition of wavelengths, according to an embodiment. When a wavelength is in a batch mode, a path-switching process on the wavelength is performed by the entire APS unit. When a wavelength is in an individual mode, a path-switching process on the wavelength is performed by one of the individual APS units.

When a failure has detected for a portion of all the wavelengths (expressed as "individual wavelength failure detection" in FIG. 20), each of the wavelengths of the portion shifts into the individual mode. When APS information that includes the batch flag "0" in association with a wavelength is received (expressed as "individual APS reception" in FIG. 20), the wavelength shifts to the individual mode, In the individual mode, a wavelength shifts to the batch mode when the states of the wavelength become the same as those recognized by the entire APS unit, that is, when the received APS information excluding the batch flag, a failure state, and a path-switching state become the same as those recognized by the entire APS units. In this case, assignment of the wavelength to the individual APS unit is cancelled, and the wavelength is assigned to the entire APS unit.

Figure 21:
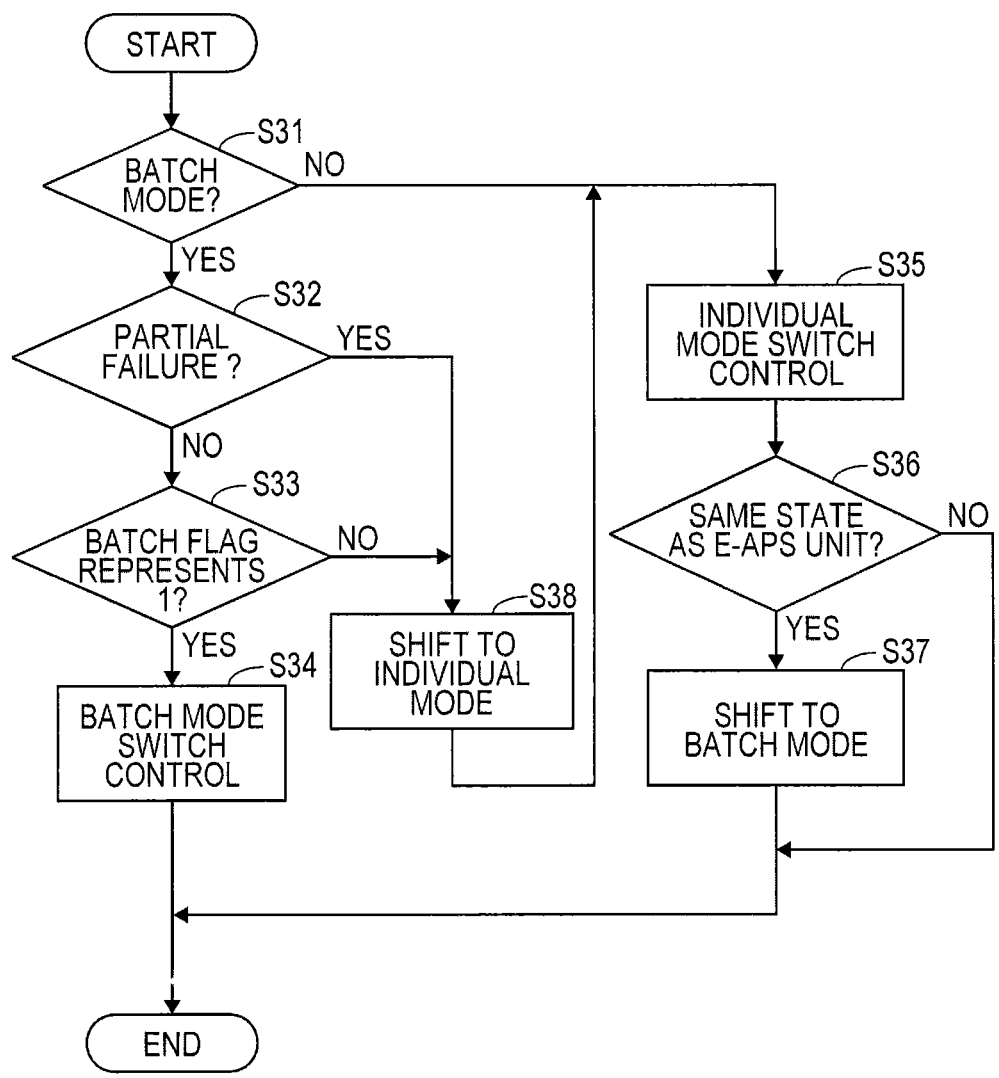
FIG. 21 is a diagram illustrating an example of an operational flowchart of a node for controlling state transition of wavelengths, according to an embodiment.

FIG. 21 is a diagram illustrating an example of an operational flowchart of a node for controlling state transition of wavelengths, according to an embodiment.

In operation S31, the switch controller 15 of the node determines whether a current operation mode of the node is a batch mode. When the current mode of the node is a batch mode (YES in operation S31), the process proceeds to operation S32, and otherwise (NO in operation S31) the process proceeds to operation S35.

In operation S32, the switch controller 15 determines whether at least one failure has partially occurred for a portion of all the wavelengths (partial failure occrrence). When at least one failure has partially occurred (YES in operation S32), the process proceeds to step S38, and otherwise (NO in operation S32) the process proceeds to step S33.

In operation S33, the switch controller 15 determines whether the batch flag is 1. When the batch flag is 1 (YES in operation S33), the process proceeds to operation S34, and otherwise (NO in operation S33) the process proceeds to operation S38.

In operation S34, the switch controller 15 activates the entire APS unit and performs a path-switching process on the wavelength using the entire APS unit (batch mode switch control).

In operation S35, the switch controller 15 activates the individual APS unit and performs a path-switching process on the wavelength using the individual APS unit In operation S36, the switch controller 15 determines whether a first state of the wavelength recognized by the individual APS unit is the same as second state of the wavelength recognized by the entire APS unit. When it is determined that the first state is the same as the second state (YES in operation S36), the process proceeds to operation S37, and otherwise (NO in operation S36) the process is terminated.

In operation S37, the switch controller 15 shifts to the batch mode.

In operation S38, the switch controller 15 shifts to the individual mode.

As described above, when the state of a wavelength processed by the individual APS unit is the same as the state of the wavelength recognized by the entire APS unit, the assignment of the wavelength to the individual APS unit is cancelled and a path-switching process on the wavelength is assigned to the entire APS unit.

Alternatively, when all the wavelengths are in normal state, that is, a failure is not detected for any of the wavelengths and all the received pieces of APS information include the bridge request codes "NR" and the status "idle", the assignment of wavelengths to the individual APS units are cancelled and all the wavelengths are assigned to the entire APS unit.

Next, description will be given of a case where partial wavelength failure has newly occurred when all the individual APS units 17-1 to 17-m are being assigned. In a state where a path-switching process for a single wavelength is being assigned to each of all the individual APS units 17-1 to 17-m in a node, when a failure has newly occurred for another single wavelength or APS information that includes the batch flag "0" in association with another single wavelength is newly received, a path-switching process for the another single wavelength is suspended.

Thereafter, when one of the individual APS units 17-1 to 17-m becomes available, the path-switching process for the suspended another single wavelength is assigned to the available one of the individual APS units 17-1 to 17-m. This allows the node to deal with failures by using a smaller number of individual APS units than the total number of wavelengths to be multiplexed, thereby reducing the circuit size.

Alternatively, as another method, in a state where all the individual APS units 17-1 to 17-m are being assigned, when a failure has occurred for a single wavelength or APS information that includes the batch flag "0" in association with a single wavelength is newly received, the switch controller 15 may assign path-switching process for the single wavelength to the entire APS unit 16. This allows a standby time from the failure occurrence to the recovery of communication to be reduced.

Further, a configuration obtained by combining the above mentioned two methods may be employed. For example, in a state where all the individual APS units 17-1 to 17-m are being assigned, when a high-priority factor for performing a path-switching process has newly arisen for a single wavelength, or APS information that includes the batch flag "0" in association with a single wavelength and is caused by a high-priority factor for performing a path-switching process is newly received, the path-switching process for the single wavelength may be assigned to the entire APS unit 16.

Furthermore, when a switching factor having low priority has newly arisen for a wavelength or when APS information that includes the batch flag "0" in association with a wavelength and is caused by a switching factor having low priority is received, the path-switching process for the wavelength may be suspended. Thereafter, when one of the individual APS units becomes available, the path-switching process for the wavelength is assigned to the available one of the individual APS units.

As described above, in accordance with priority of a transmission traffic, the path-switching process for a traffic having high priority is assigned to the entire APS unit 16, and the path-switching process for a traffic having low priority is suspended until one of the individual APS units becomes available. This allows communication recovery control to be appropriately performed in accordance with the priority of the traffics.

In the case of implementing the individual APS units using software, when a path-switching process to be performed by an additional individual APS unit is required, the additional individual APS unit may be newly generated using the software. In the case, when the additional individual APS unit is no longer used, the additional individual APS unit may be removed.

As described above, when failures have occurred in all the optical signals having all the wavelengths used in the optical fiber, for example, due to breakdown of the optical fiber, path-switching processes may be performed by the entire APS unit. Meanwhile, when at least one failure has occurred in at least one optical signal having a portion of all the wavelengths used in the optical fiber, for example, due to a failure of a laser, path-switching processes may be performed using a smaller number of individual APS units than the total number of wavelengths to be multiplexed.

Since there is a low probability that failures occur simultaneously in a plurality of lasers, it is possible to beforehand reduce the number of individual APS units to be used, without preparing as many individual APS units as the number of all the wavelengths which is the case in the related art. With this configuration, the circuit size may be reduced.

Although the embodiment has been described hereinabove, the configurations of the components in the embodiment are replaceable by others having the same functions. Furthermore, other arbitrary components and other arbitrary operations may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for switching paths in a wavelength-multiplexing network in which a first number of wavelengths each used for a path to transmit an optical signal are multiplexed into an optical fiber, the apparatus comprising:
   an entire switching unit configured to perform a path-switching process for switching a path, simultaneously on all the first number of wavelengths when failures have occurred for all the first number of wavelengths;
   a second number of individual switching units each configured to perform the path-switching process individually on one of a third number of wavelengths included in the first number of wavelengths when at least one failure has occurred for the third number of wavelengths, wherein the second and third numbers are each smaller than the first number; and
   a switch controller that assigns the path-switching process to a switching unit that is selected from among the entire switching unit and the second number of individual switching units based on failure information detected by the apparatus or protection information indicating operational states of nodes in the wavelength-multiplexing network.

2. The apparatus of claim 1,
   wherein the protection information includes, in association with each of the first number of wavelengths, flag information indicating whether the path-switching process is to be performed by the entire switching unit or by one of the second number of individual switching units.

3. The apparatus of claim 2, wherein
when the switch controller detects, based on the failure information, that failures have occurred for all the first number of wavelengths, the switch controller assigns, to the entire switching unit, the path-switching process on all the first number of wavelengths, and the entire switching unit transmits to another apparatus the protection information that includes, in association with each of all the first number of wavelengths, the flag information having a first value indicating that the path-switching process on the each of all the first number of wavelengths is to be performed by the entire switching unit; and
when the switch controller determines, based on the failure information, that at least one failure has occurred for the third number of wavelengths, the switch controller assigns, to one of the second number of individual switching units, the path-switching process on each of the third number of wavelengths, and the one of the second number of individual switching unit transmits to the another apparatus the protection information that include, in association with the each of the third number of wavelengths, the flag information having a second value indicating that the path-switching process on the each of the third number of wavelength is to be performed by the one of the second number of individual switching units.

4. The apparatus of claim 3, wherein,
when the switch controller has detected, under a first condition that all the second number of individual switching units are in-use, at least one failure for the third number of wavelengths, the switch controller suspends the path-switching process on the third number of wavelengths;
when the switch controller has received, under the first condition, the protection information including the flag information having the second value associated with at least one wavelength, the switch controller suspends the path-switching process on the at least one wavelength; and
under a second condition that one of the second number of individual switching units is available, the switch controller assigns, to the available one of the second number of individual switching units, the path-switching process on one of wavelengths on which the path-switching process has been suspended.

5. The apparatus of claim 3, wherein,
when the switch controller has detected, under a first condition that all the second number of individual switching units are in-use, at least one failure for the third number of wavelengths, the switch controller assigns, to the entire switching unit, the path-switching process on the third number of wavelengths; and
when the switch controller has received, under the first condition, the protection information including the flag information having the second value associated with at least one wavelength, the switch controller assigns, to the entire switching unit, the path-switching process on the at least one wavelength.

6. The apparatus of claim 2, wherein, upon receiving the protection information,
the switch controller assigns, to the entire switching unit, the path-switching process on a wavelength that is associated with the first value being set to the flag information included in the received protection information, and
the switch controller assigns, to one of the second number of individual switching units, the path-switching process on a wavelength that is associated with the second value being set to the flag information included in the received protection information.

7. The apparatus of claim 2, further comprising:
a first table indicating which one of the first number of wavelengths is assigned to which one of the entire switching unit and the second number of individual switching units, wherein
the switch controller, upon receiving the protection information that includes the flag information having the second value associated with one of the first number of wavelengths, searches the first table for available one of the second number of individual switching units, and
the switch controller assigns, to the available one of the second number of individual switching units, the path-switching process on the one of the first number of wavelengths.

8. The apparatus of claim 2, further comprising:
a second table that defines one or more wavelength groups each consisting of a fourth number of wavelengths included in the first number of wavelengths, wherein,
when failures have occurred for all the fourth number of wavelengths, the switch controller assigns, to the entire switching unit, the path-switching process on all the fourth number of wavelengths; and
when at least one failure has occurred for a fifth number of wavelengths included in the fourth number of wavelengths where the fifth number is smaller than the fourth number, the switch controller assigns, to one of the second number of individual switching units, the path-switching process on each of the fifth number of wavelengths.

9. The apparatus of claim 2, wherein,
when the switch controller has detected, under a first condition that all the second number of individual switching units are in-use, a high-priority factor for performing the path-switching process on the third number of wavelengths, the switch controller assigns, to the entire switching unit, the path-switching process on the third number of wavelengths;
when the switch controller has received, under the first condition, the protection information including the flag information having the second value caused by a high-priority factor for performing the path-switching process on first at least one wavelength, the switch controller assigns the path-switching process on the first at least one wavelength to the entire switching unit;
when the switch controller has detected, under the first condition, a low-priority factor for performing path-switching process on the third number of wavelengths, the switch controller suspends the path-switching process on the third number of wavelengths;
when the switch controller has received, under the first condition, the protection information including the flag information having the second value caused by a low-priority factor for performing the path-switching process on second at least one wavelength, the switch controller suspends the path-switching process on the second at least one wavelength; and
under a second condition that one of the second number of individual switching units is available, the switch controller assigns, to the available one of the second number of individual switching units, the path-switching process on one of wavelengths on which the path-switching process has been suspended.

10. A method for switching paths in a wavelength-multiplexing network in which a first number of wavelengths each used for a path to transmit an optical signal are multiplexed into an optical fiber, the method comprising:
- providing each of nodes in the wavelength-multiplexing network with an entire switching unit and a second number of individual switching units, the second number being smaller than the first number;
- assigning the path-switching process to a switching unit that is selected from among the entire switching unit and the second number of individual switching units based on failure information detected by the apparatus or protection information indicating operational states of nodes in the wavelength-multiplexing network;
- causing the entire switching unit to perform path-switching process for switching a path, simultaneously on all the first number of wavelengths when failures have occurred for all the first number of wavelengths; and
- causing each of the second number of individual switching units to perform the path-switching process individually on one of a third number of wavelengths included in the first number of wavelengths when at least one failure has occurred for the third number of wavelengths where the third number is smaller than the first number.

* * * * *